United States Patent
Schlenoff

(10) Patent No.: US 8,314,158 B2
(45) Date of Patent: Nov. 20, 2012

(54) COMPACTED POLYELECTROLYTE COMPLEXES AND ARTICLES

(75) Inventor: Joseph B. Schlenoff, Tallahassee, FL (US)

(73) Assignee: The Florida State University Research Foundation, Inc., Tallahassee, FL (US)

( * ) Notice: Subject to any disclaimer, the term of this patent is extended or adjusted under 35 U.S.C. 154(b) by 0 days.

(21) Appl. No.: 13/346,272

(22) Filed: Jan. 9, 2012

(65) Prior Publication Data
US 2012/0108684 A1    May 3, 2012

Related U.S. Application Data

(62) Division of application No. 12/542,260, filed on Aug. 17, 2009, now Pat. No. 8,114,918.

(60) Provisional application No. 61/089,286, filed on Aug. 15, 2008.

(51) Int. Cl.
- *C08J 5/20* (2006.01)
- *C08J 5/00* (2006.01)
- *B05D 1/18* (2006.01)
- *B32B 27/32* (2006.01)
- *B32B 27/00* (2006.01)

(52) U.S. Cl. .......... 521/27; 428/323; 428/220; 428/500; 524/442; 524/413; 524/445; 524/500

(58) Field of Classification Search .................... 521/27; 428/323; 524/442, 413, 445, 35, 500; 264/239, 264/176.1
See application file for complete search history.

(56) References Cited

U.S. PATENT DOCUMENTS

| | | | |
|---|---|---|---|
| 3,276,598 | A | 10/1966 | Michaels et al. |
| 3,546,142 | A | 12/1970 | Michaels et al. |
| 3,558,744 | A | 1/1971 | Michaels et al. |
| 3,565,973 | A | 2/1971 | Michaels |
| 4,539,373 | A | 9/1985 | Mani et al. |
| 5,208,111 | A | 5/1993 | Decher et al. |
| 6,660,367 | B1 | 12/2003 | Yang et al. |
| 6,905,875 | B2 | 6/2005 | Yu et al. |
| 7,101,947 | B2 | 9/2006 | Schlenoff et al. |
| 7,105,229 | B2 | 9/2006 | Anderson |
| 7,223,327 | B2 | 5/2007 | Schlenoff et al. |
| 7,238,536 | B1 | 7/2007 | Schlenoff |
| 7,365,142 | B2 | 4/2008 | Schlenoff et al. |
| 7,387,824 | B2 | 6/2008 | Tamagawa et al. |
| 2004/0265603 | A1 | 12/2004 | Schlenoff |

(Continued)

FOREIGN PATENT DOCUMENTS

WO    2005091755 A2    10/2005

(Continued)

OTHER PUBLICATIONS

Allen, Norman S., "Polymer Photochemisty", Photochemistry, 2007, vol. 36, pp. 232-297.

(Continued)

*Primary Examiner* — Michael M Bernshteyn
(74) *Attorney, Agent, or Firm* — Armstrong Teasdale LLP

(57) ABSTRACT

This invention relates to an osmotically compacted polyelectrolyte complex having a first region and a second region, the first region having a greater modulus than the second region and a method for preparing such an article. The article comprising the polyelectrolyte complex is produced by contacting a polyelectrolyte complex with a solution comprising an osmolyte at a concentration sufficient to compact the polyelectrolyte complex. The compaction process is terminated before the entire article is osmotically compacted.

11 Claims, 10 Drawing Sheets

U.S. PATENT DOCUMENTS

| | | | |
|---|---|---|---|
| 2005/0282925 | A1 | 12/2005 | Schlenoff et al. |
| 2005/0287111 | A1 | 12/2005 | Schlenoff et al. |
| 2006/0051532 | A1 | 3/2006 | Tamagawa et al. |
| 2006/0065529 | A1 | 3/2006 | Schlenoff et al. |
| 2006/0073333 | A1* | 4/2006 | Anderson .................. 428/402.2 |
| 2007/0259452 | A1 | 11/2007 | Schlenoff |
| 2007/0265174 | A1 | 11/2007 | Schlenoff |
| 2009/0162640 | A1 | 6/2009 | Schlenoff |

FOREIGN PATENT DOCUMENTS

| | | | |
|---|---|---|---|
| WO | 2008027989 | A2 | 3/2008 |

OTHER PUBLICATIONS

Bergethon, Peter R., "The Physical Basis of Biochemistry: The Foundations of Molecular Biophysics", 1998, Springer, New York, pp. 232-236.

Biggerstaff et al., "Damping Performance of Cocured Graphite/Epoxy Composite Laminates with Embedded Damping Materials", Journal of Composite Materials, 1999, vol. 33, No. 15, pp. 1457-1469.

Dai et al., "Controlling the Permeability of Multilayered Polyelectrolyte Films through Derivatization, Cross-Linking, and Hydrolysis", Langmuir, 2001, vol. 17, No. 3, pp. 931-937.

Dubas, et al., Swelling and Smoothing of Polyelectrolyte Multilayers by Salt, Langmuir, 2001, vol. 17 pp. 7725-7727.

Graul et al., "Capillaries Modified by Polyelectrolyte Multilayers for Electrophoretic Separations", Analytical Chemisty, 1999, vol. 71, No. 18, pp. 4007-4013.

Holmlin et al., "Zwitterionic SAMs that Resist Nonspecific Absorption of Protein from Aqueous Buffer", Langmuir, 2001, vol. 17, No. 9, pp. 2841-2850.

Iatridis et al., "Shear Mechanical Properties of Human Lumbar Annulus Fibrosus", Journal of Orthopaedic Research, 1999, vol. 17, No. 5, pp. 732-737.

Iatridis et al., "The Viscoelastic Behavior of the Non-Degenerate Human Lumbar Nucleus Pulposus in Shear", J. Biomechanics, 1997, vol. 30, No. 10, pp. 1005-1013.

Jaber et al., "Dynamic Viscoelasticity in Polyelectrolyte Multilayers: Nanodamping", Chem. Materials, 2006, vol. 18 pp. 5768-5773.

Jaber et al., "Mechanical Properties of Reversibly Cross-Linked Ultrathin Polyelectroyte Complexes", Journal of American Chemical Society, 2006, vol. 128, pp. 2940-2947.

Jiang et al., "Freestanding Nanostructures via Layer-by-Layer Assembly", Advanced Materials, 2006, vol. 18, pp. 829-840.

Kozlovskaya et al., "Hydrogen-Bonded Polymer Capsules Formed by Layer-by-Layer Self-Assembly", Macromolecules, 2003, vol. 36, pp. 8590-8592.

Lim et al., "Microencapsulated Islets as Bioartificial Endrocrine Pancreas", Science, New Series, 1980, vol. 210, No. 4472, pp. 908-910.

Losche et al., "Detailed Structure of Molecularly Thin Polyelectrolyte Multilayer Films on Solid Substrates as Revealed by Neutron Reflectometry", Macromolecules, 1998, vol. 31, No. 25, pp. 8893-8906.

Malasamy et al., "High-Flux Nanofiltration Membranes Prepared by Adsorption of Multilayer Polyelectrolyte Membranes on Polymeric Supports", Langmuir, 2005, vol. 21, pp. 10587-10592.

Michaels, Alan S., "Polyelectrolyte Complexes", Industrial & Engineering Chemistry, 1965, vol. 57, No. 10, pp. 32-40.

Miller et al., "Controlling the Nanofiltration Properties of Multilayer Polyelectrolyte Membranes through Variation of Film Composition", Langmuir, 2004, vol. 20, No. 26, pp. 11545-11551.

Nolte et al., "Filled Microcavity Arrays Produced by Polyeletrolyte Multilayer Membrane Transfer", Advanced Materials, 2005, vol. 17, pp. 1665-1669.

Rosidian et al., "Ionic Self-Assembly of Ultrahard ZrO2/Polymer Nanocomposite Thin Films", Advanced Materials, 1998, vol. 10, No. 14 pp. 1087-1091.

Smets, G., "Photocross-Linkable Polymers", Journal of Macromolecular Science Chemistry, 1984, A21(13 & 14), pp. 1695-1703.

Strehmel, Veronika, "Epoxies: Structures, Photoinduced Cross-Linking, Network Properties, and Applications", Handbook of Photochemistry and Photobiology, 2003, Chapter 1, pp. 1-110.

Sui et al., "Phase Separations in pH-Responsive Polyelectrolyte Multilayers: Charge Extrusion versus Charge Expulsion", Langmuir, 2004, vol. 20, No. 14, pp. 6026-6031.

Sukhishvili et al., "Layered, Erasable Polymer Multilayers Formed by Hydrogen-Bonded Sequential Self-Assembly", Macromolecules, 2002, vol. 35, pp. 301-310.

Sullivan et al., "Ultrathin, Gas-Selective Polyimide Membranes Prepared from Multilayer Polyelectrolyte Films", Chem. Materials, 2003, vol. 15, pp. 281-287.

Sun, S.F., "Physical Chemistry of Macromolecules: Basic Principles and Issues", 1994, 34 pages, John Wiley & Sons, Inc., New York.

Timpe, Hans-Joachim, "Polymer Photochemistry and Photo-Cross-Linking", Desk Reference of Functional Polymers Syntheses and Applications, 1997, pp. 273-291.

Poly(Ethylene Glycol) Chemistry: Biotechnical and Biomedical Applications (Table of Contents only), Edited by Milton J. Harris, 1992, 13 pages, Plenum Press, New York, New York.

R. Reese Handbook of Antibiotics (Table of Contents and Preface only), Third Edition, 2000, 3 pages, Lippincott Williams and Wilkins, Philadelphia, Pennsylvania.

Spinning, Extruding, and Processing of Fibers: Recent Advances, edited by J.S. Robinson, 1980, pp. 126-140, N. J. Noyes Data Corp., Park Ridge, New Jersey.

\* cited by examiner

US 8,314,158 B2

COMPACTED POLYELECTROLYTE COMPLEXES AND ARTICLES

CROSS-REFERENCE TO RELATED APPLICATIONS

This application is a divisional application of U.S. application Ser. No. 12/542,260, which was filed Aug. 17, 2009 and published as U.S. Pub. No. 2010/0041777, now U.S. Pat. No. 8,114,918. U.S. application Ser. No. 12/542,260 claims priority from U.S. provisional application, U.S. Provisional Ser. No. 61/089,286, which was filed on Aug. 15, 2008.

STATEMENT REGARDING FEDERALLY SPONSORED RESEARCH OR DEVELOPMENT

This invention was made with Government support from the National Science Foundation under Grant No. DMR-0309441. The Government has certain rights in the invention.

FIELD OF THE INVENTION

The present invention relates to methods and materials to form compacted articles comprising a polyelectrolyte complex and uses of said articles.

BACKGROUND OF THE INVENTION

Mechanical damping materials remove energy from a system. Motions to be damped can be periodic and regular (e.g., sine wave, square wave) or they can be irregular. Often a single mechanical event must be damped. Such an event is termed a shock, and the mechanical damping is termed shock absorption. Most damping measurements apply a periodic deformation to the article being tested, but it is also possible to assess the damping characteristics of a material from a single shock.

The Young's modulus, E, (also known as elastic modulus, modulus of elasticity, or tensile modulus) is a measure of the stiffness of a material. E is the ratio between the tensile stress, $\sigma$, divided by the tensile strain, e. E is typically measured on a tensile apparatus which elongates a material and reports the stress needed to produce a certain strain. Alternatively, a sample is compressed and the required stress for a needed deformation is measured. E may be measured under static, or quasi-static, conditions, where the stress does not vary with time. Alternatively, the modulus can be measured under dynamic or time-varying conditions where a material may exhibit properties of elasticity and viscous flow (viscoelasticity) in which case the modulus depends on frequency of deformation and a complex modulus, $E^*$, is defined, where $E^* = E_1 + iE_2$, where $E_1$ is the storage modulus, which is a measure of energy stored on a deformation cycle, and $E_2$ is the loss modulus, which is a measure of the energy lost on a cycle.

There is a need for materials and articles that exhibit damping and/or shock absorbing properties. PCT application WO/2008/027989 discloses the use of materials and articles comprising blends of positive polyelectrolytes and negative polyelectrolytes, also termed "polyelectrolyte complexes." Polyelectrolyte complexes are prepared in a straightforward manner by mixing solutions of positive and negative polyelectrolytes. The complexes that precipitate from solution have very poor mechanical properties, and PCT application WO/2008/027989 discloses methods for compacting these complexes to provide articles with improved mechanical properties.

A method of preparing thin films of polyelectrolyte complexes was disclosed in U.S. Pat. No. 5,208,111. In this method, a substrate is exposed in an alternating fashion to positive and negative polyelectrolytes. The resulting "polyelectrolyte multilayers" have a composition similar to solution-precipitated polyelectrolyte complexes. However, each layer of polyelectrolyte added to a growing film has an opportunity to complex efficiently and completely with the existing material, excluding additional of water. Thus, the mechanical properties of polyelectrolyte multilayers and solution-precipitated polyelectrolyte complexes differ.

Recent studies have evaluated the mechanical properties of polyelectrolyte multilayers, which are typically less than one micrometer thick. See, for example, Jaber, J. A. and Schlenoff, J. B., J. Am. Chem. Soc. 128, 2940-2947 (2006). The elastic modulus of these films ranges from kPa to MPa. However, these films are far too thin (a few micrometers or less) to be used for mechanical components in most systems.

The maximum amplitude of mechanical damping of an article generally depends on the physical dimensions of the article. Thus, there is a need to prepare articles with dimensions in the millimeter to centimeter scale to absorb the shock of mechanical vibrations on the millimeter scale. While a polyelectrolyte complex is easily prepared by mixing solutions of individual polyelectrolytes well, the precipitate is gelatinous and difficult to process. The dried complexes, for example, are generally infusible and therefore cannot be injection molded or reformed into articles under elevated temperatures. See Michaels, A. S., J. Industrial Engin. Chem. 57, 32-40 (1965).

PCT application WO/2008/027989 describes methods of compacting polyelectrolyte complexes to form articles in the presence of a salt. The moduli of these articles, while significantly greater than the uncompacted materials, are significantly lower than expected. For example, the modulus of a complex of poly(diallyldimethylammonium) and poly(styrene sulfonate) (PDADMA/PSS) in the multilayer form was a maximum of about 17 MPa whereas the identical polyelectrolytes after compaction by the method described in PCT application WO/2008/027989 was only about 1 MPa. Although many applications, especially those related to the damping of mechanical vibrations, require materials with moduli in the kPa-MPa range, other applications benefit from materials of higher strength, those having moduli in the MPa and above range. There is a need to transform solution precipitated polyelectrolyte complexes into the highest-strength material possible.

Polyelectrolyte complexes have been proposed as tissue engineering scaffolding (e.g., see Lim and Sun, Science, 210: 908-910 (1980) and Yu et al., U.S. Pat. No. 6,905,875). The purpose of a tissue engineering scaffold is to support and maintain growing cells. Thus, these scaffolds are usually soft and porous and, therefore, not well suited for use as a compressive mechanical support. A tissue engineering scaffold is typically designed, prepared and employed without designing or expecting a particular damping property.

SUMMARY OF THE INVENTION

Among the various aspects of the present invention may be noted a method for the compaction of a complex comprising and interpenetrating network of positively and negatively charged polyelectrolytes, said complex being compacted by the action of solutions of high osmotic pressure.

The present invention is directed to a method of modifying an elastic modulus of an article comprising a polyelectrolyte complex, the polyelectrolyte complex comprising an intermolecular blend of at least one predominantly positively charged polyelectrolyte polymer and at least one predominantly negatively charged polyelectrolyte polymer. The method comprises contacting the article with a first solution comprising an osmolyte to thereby change a water concentration in the article from a first water concentration to a second water concentration, wherein the osmolyte has a structure such that the osmolyte is inhibited from permeating into the article comprising the polyelectrolyte complex and wherein changing the water concentration changes the elastic modulus of at least a portion of the article comprising the polyelectrolyte complex from a first elastic modulus to a second elastic modulus.

The present invention is further directed to a method of modifying the elastic modulus of an article comprising a polyelectrolyte complex, the polyelectrolyte complex comprising an interior region and a surface region, wherein the interior region comprises an intermolecular blend of at least one interior positively charged polyelectrolyte polymer and at least one interior negatively charged polyelectrolyte polymer, the surface region comprises an intermolecular blend of at least one surface positively charged polyelectrolyte polymer and at least one surface negatively charged polyelectrolyte polymer, the surface region has a surface elastic modulus, and the interior region has an interior elastic modulus. The method comprises applying a mechanical force to compact the article comprising the polyelectrolyte complex to thereby form a compacted article comprising the polyelectrolyte complex and contacting the compacted article comprising the polyelectrolyte complex with a first solution comprising an osmolyte to thereby change a water concentration in the article from a first water concentration to a second water concentration, wherein the osmolyte has a structure such that the osmolyte is inhibited from permeating into the article comprising the polyelectrolyte complex and wherein contact with the first solution changes the surface elastic modulus relative to the interior elastic modulus.

The present invention is further directed to an osmotically compacted article comprising a polyelectrolyte complex, the polyelectrolyte complex comprising an interior region and a surface region, wherein the interior region comprises an intermolecular blend of at least one interior positively charged polyelectrolyte polymer and at least one interior negatively charged polyelectrolyte polymer, the surface region comprises an intermolecular blend of at least one surface positively charged polyelectrolyte polymer and at least one surface negatively charged polyelectrolyte polymer, the surface region has a surface elastic modulus, the interior region has an interior elastic modulus, and the surface elastic modulus is greater than the interior elastic modulus.

The present invention is further directed to a method for compacting an article comprising an intermolecular mixture of positive and negative polyelectrolytes using osmotic pressure, said method comprises exposing said article to a solution of osmolyte which is excluded from the article. In one aspect, the osmolyte has a molecular weight of at least 300. In another aspect, the osmolyte is a hydrophilic polymer. In yet another aspect, the osmolyte is selected from the group poly(ethylene glycol), poly(ethylene oxide), polyelectrolytes, polyzwitterions, poly(acrylamide). In yet another aspect, the osmotic pressure of the solution is at least 10% greater than the internal osmotic pressure of the article. The present invention is further directed to a compacted article prepared thereby.

The present invention is further directed to a method of producing an osmotically compacted polyelectrolyte complex having a first region and a second region, the first region having a greater modulus than the second region, said method comprising contacting an article comprising polyelectrolyte complex to a solution comprising a preferred osmolyte of concentration sufficient to compact said polyelectrolyte complex; and terminating the compaction process before the entire article is osmotically compacted. The present invention is further directed to a compacted article prepared thereby.

The present invention is further directed to a treatment for an article comprising a polyelectrolyte complex, said treatment comprising exposure of a polyelectrolyte complex to a solution of osmotic pressure greater than the internal osmotic pressure of the article.

One aspect of the present invention is the provision of an article that may be used to dampen the vibrations between two abutting surfaces, and to methods for preparing such an article. In one embodiment, the article is a 3-dimensional object comprising osmotically compacted polyelectrolyte complex adapted for mechanical damping operations, which may be used for mechanical damping over the frequency range $0.1$-$10^6$ Hz. The present invention is further directed to an article adapted for in vivo use in joints, said joints including the intravertebral space, the knee joint, the shoulder joint, the elbow joint and the hip joint.

Briefly, therefore, one aspect of the present invention is an article comprising a polyelectrolyte complex. The polyelectrolyte complex comprises an intermolecular blend of a predominantly positively-charged polyelectrolyte and a predominantly negatively charged polyelectrolyte. The polyelectrolyte complex is free of salt crystals having a size greater than about 1 micrometer.

The present invention is further directed to a method for forming an article comprising polyelectrolyte complex wherein the article comprises an outer region and an inner region, the outer region having a modulus that is greater than the modulus of an inner region. The outer region is termed a "shell" or a "skin" and the inner region is termed a "core." If the outer region is thinner than about one mm it may be considered a "skin." The core/shell morphology is obtained by the action of a solution of high osmotic pressure on the polyelectrolyte complex.

Other objects and features will be in part apparent and in part pointed out hereinafter.

DESCRIPTION OF THE EMBODIMENT(S) OF THE INVENTION

Figure 1:
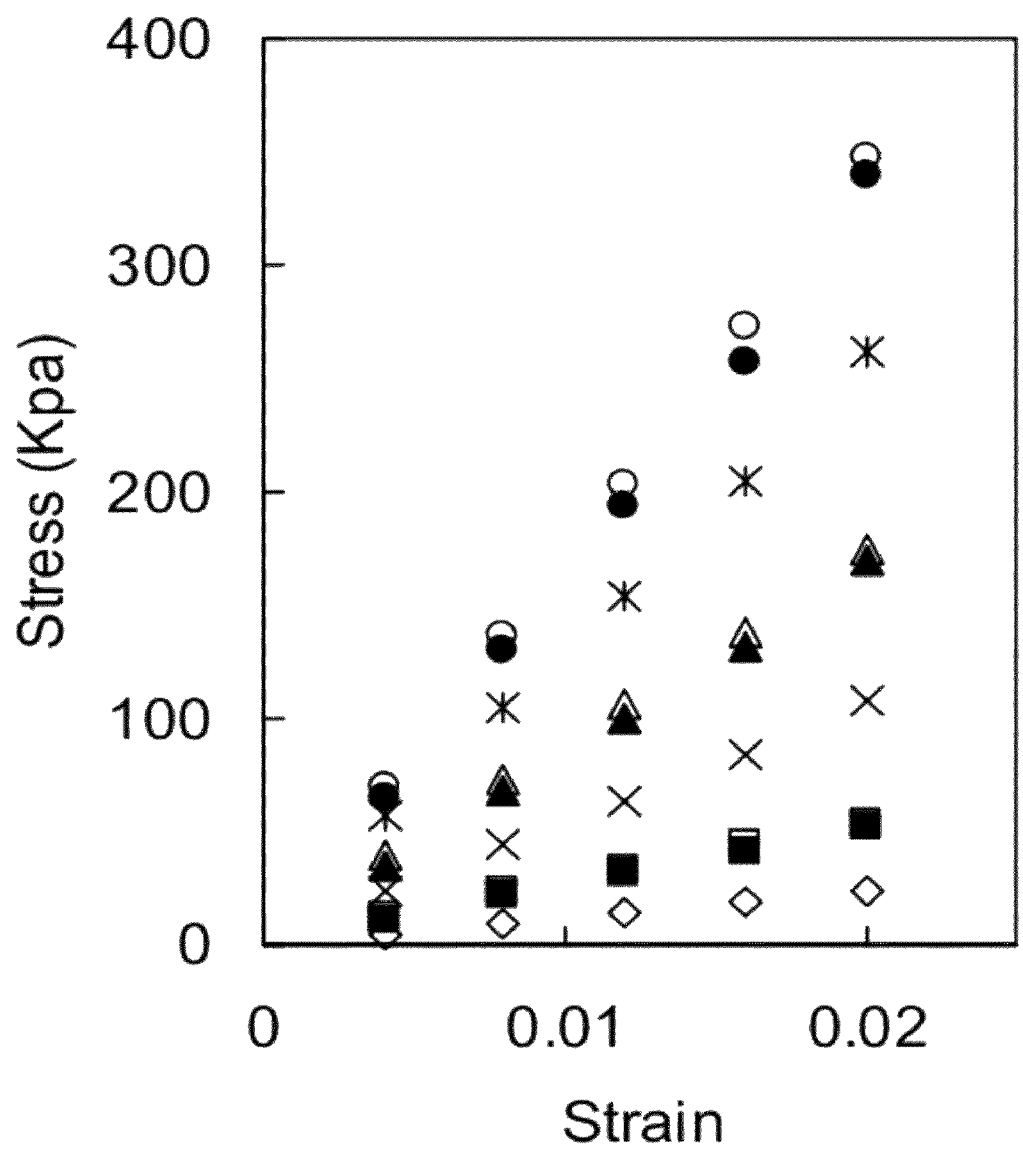
FIG. 1 is a graph depicting stress-strain curves of a $(PDADMA/PSS)_{250}$@1.0M NaCl multilayer at different salt concentrations. Open circles, asterisk, triangles, crosses, squares and diamonds correspond to the stretching cycle (in increasing order of elongation) with salt concentrations of 0.0, 0.2, 0.4, 0.6, 0.8 and 1.0M NaCl respectively. Solid circles, triangles and squares indicate a decreasing elongation cycle at 0.0, 0.4, 0.8M. A similar trend was observed at the other salt concentrations. The data in the graph were obtained according to the method of Example 1.

One aspect of the invention is an article capable of damping vibrations. The article comprises a polymer, in particular, a polymer known as a "polyelectrolyte" that comprises multiple electrolytic groups that dissociate in aqueous solutions, making the polymer charged. The article of the present invention comprises a polyelectrolyte complex, that is, an intermolecular blend of a predominantly positively-charged polyelectrolyte and a predominantly negatively-charged polyelectrolyte. In some embodiments, the polyelectrolyte complex is preferably first compacted by a method described in PCT WO/2008/027989, the disclosure of which is hereby incorporated as if set forth in its entirety. This first compaction step increases the density of the article comprising polyelectrolyte complex to a point where it may be shaped into an article by cutting or extrusion. Preferably, the article is such that the shape is retained and the article formed possesses elastic or shape-memory properties. That is, when subjected to a stress the article deforms and when the stress is removed the article substantially recovers its initial shape. The first compaction step, such as by centrifugation or pressure, provides an article with dimensions typically on the order of millimeters to centimeters, which is also substantially greater than that achievable by conventional multilayering. According to the method of the present invention, the first compaction step is then followed by a second compaction step, wherein the polyelectrolyte complex is further compacted by the action of a solution with sufficient osmotic pressure.

The phenomenon of osmotic pressure is well known to the art. Osmotic pressure is described in for example "The Physical Basis of Biochemistry: The Foundations of Molecular Biophysics" by Peter R. Bergethon, New York: Springer, 1998; and "Physical Chemistry of Macromolecules: Basic Principles and Issues," by S.F. Sun. New York: John Wiley, 1994. The osmotic pressure, π, is given by $$\pi = iMRT$$

wherein i is the van't Hoff factor (often=1 for small nonelectrolytes), M is the concentration (moles per liter), R is the gas constant (0.08206 L atm mol$^{-1}$ K$^{-1}$) and T is the temperature (in Kelvin). Osmotic pressure has various units, depending on the units for M and R. In the equation above, Π would have units of atmospheres. By definition, water migrates from regions of low osmotic pressure to regions of high osmotic pressure.

Classically, osmotic pressure is developed between two solutions separated by a semipermeable membrane. "Semipermeable" refers to a membrane that is permeable to water but not to other molecules, typically called osmolytes. Because the osmolytes cannot cross the membrane they create an imbalance in the water concentration. There is thus a driving force, or chemical potential, for water to cross the membrane from the side where it is in higher concentration to the side where it is in lower concentration.

Semipermeable membranes exist extensively in nature and are also commercially produced. For example, cell membranes in animals and plants are semipermeable (to water) and require their surroundings to have the same osmotic pressure as their interiors for proper functioning. Such a condition is known as isotonic. If the osmotic pressure of their surroundings is too great, cells lose water and shrink, and if π is too low, cells expand and can even burst.

Polyelectrolyte multilayers have been prepared as membranes and have been shown to be semipermeable. For example, Bruening (*Langmuir*, 20 (26), 11545-11551, 2004) has demonstrated that polyelectrolyte multilayers, when used as membranes separating two compartments, are permeable to water and some small ions and molecules, such as sucrose, but are much less permeable to large molecules.

It should be noted that the use of osmotic pressure in the present invention is different and distinct from the membrane uses known to the art. In one embodiment of the present invention, the article may be compacted by immersing the article in the osmolyte, such that the article is completely surrounded by osmolyte and osmotic pressure is generated between the outside solution and the inside of the article. In this embodiment, there is no membrane formed.

In general, the polyelectrolyte complex is formed by combining at least one predominantly negatively charged polyelectrolyte polymer and at least one predominantly positively charged polyelectrolyte polymer to form an article. The polyelectrolyte complex may be formed by combining blends of one, two, or more predominantly negatively charged polyelectrolyte polymers and one, two, or more predominantly positively charged polyelectrolyte polymers. In a preferred embodiment, the article is prepared by combining separate solutions, each containing one of the polyelectrolytes; in this embodiment, at least one solution comprises a predominantly positively-charged polyelectrolyte, and at least one solution comprises a predominantly negatively-charged polyelectrolyte. Either or both of these solutions may comprise additives, such as salt ions. The formation of a polyelectrolyte complex, Pol$^+$Pol$^-$, by mixing individual solutions of the polyelectrolytes in their respective salt forms, Pol$^+$A$^-$ and Pol$^-$M$^+$, may be represented by the following equation:

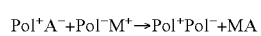

where M$^+$ is a salt cation, such as sodium, and A$^-$ is a salt anion such as chloride. Pol$^-$ and Pol$^+$ represent repeat units on predominantly negatively charged and predominantly positively charged polyelectrolytes, respectively. According to the equation, the process of complexation releases salt ions into external solution, which are then part of the salt solution concentration.

Separate solutions containing the polyelectrolytes are preferably combined in a manner that allows the positively-charged polyelectrolyte and the negatively-charged polyelectrolyte to intermix. Intermixing the respective polyelectrolytes causes the in situ formation of a polyelectrolyte complex comprising an intermolecular blend of the positively-charged polyelectrolyte and the negatively-charged polyelectrolyte. Preferably, at least one of the solutions comprises salt ions, such that salt ions also intermix with and become part of the polyelectrolyte complex. The resulting polyelectrolyte complex may simply be allowed to precipitate and settle to the bottom of the container. The supernatant is, in a preferred embodiment, separated to the extent possible from the polyelectrolyte complex.

Individual polyelectrolyte solutions that are mixed may themselves comprise mixtures of polyelectrolytes. For example, a solution may comprise two positive polyelectrolytes with two distinct chemical compositions. When the mixture of positive polyelectrolytes is mixed with the negative polyelectrolyte solutions the resulting complex will incorporate a blend of the two positive polyelectrolytes. Such a strategy is described for example in Z. Sui, J. B. Schlenoff, Langmuir vol. 18, p 8263 (2003).

The precipitated polyelectrolyte complex is preferably compacted by mechanical means prior to exposure to the osmolyte. In one embodiment, compacting may be accomplished by centrifugation, such that the polyelectrolyte complex is compacted into a plug of material inside the centrifuge vessel. In a preferred embodiment, salt is present during compaction.

Thereafter, the compacted article comprising polyelectrolyte complex is further compacted by exposure to a solution having high osmotic pressure. In one embodiment, the compacted article comprising polyelectrolyte complex is exposed to a solution comprising an osmolyte having physical and chemical characteristics that cause the osmolyte to be excluded from the article. That is, the osmolyte may have a minimum molecular weight or other characteristics that inhibit the osmolyte from permeating into the bulk of the article comprising polyelectrolyte complex. Preferably, the solution comprising the osmolyte has an osmotic pressure greater than an internal osmotic pressure of the article, such as at least 10% greater, which causes water to migrate from the region of low osmotic pressure, i.e., the interior of the article comprising polyelectrolyte complex to the region of high osmotic pressure, i.e., the osmolyte containing solution, thereby lowering the water concentration in at least a portion of the article from a first, higher water concentration to a second, lower water concentration.

Lowering the water concentration in at least a portion of the article thereby causes an increase in the elastic modulus of that portion of the article. It has been observed that osmotic compaction of an article comprising polyelectrolyte complex may increase the elastic modulus for a given strain by a factor greater than 50×. For example, the elastic modulus for a polyelectrolyte complex having a certain composition and water content may increase from an elastic modulus ranging from about 1000 kPa to about 5000 kPa to an elastic modulus ranging from about 50,000 kPa (50 MPa) to about 250,000 kPa (250 MPa). At certain strains, the osmotic compaction of an article comprising polyelectrolyte complex increases the elastic modulus for a given strain by a factor greater than about 60×, e.g., from about 1000 kPa to about 5000 kPa to an elastic modulus ranging from about 60,000 kPa (60 MPa) to about 300,000 kPa (300 MPa). At certain strains, the osmotic compaction of an article comprising polyelectrolyte complex may increase the elastic modulus for a given strain by a factor greater than about 70×, e.g., from about 1000 kPa to about 5000 kPa to an elastic modulus ranging from about 70,000 kPa (70 MPa) to about 350,000 kPa (350 MPa). At certain strains, the osmotic compaction of an article comprising polyelectrolyte complex may increase the elastic modulus for a given strain by a factor greater than about 75×, e.g., from about 1000 kPa to about 5000 kPa to an elastic modulus ranging from about 75,000 kPa (75 MPa) to about 375,000 kPa (375 MPa). The elastic modulus of the article comprising polyelectrolyte complex prior to compaction by exposure to osmolyte may vary over a wide range, such as below 1000 kPa to above 5000 kPa and may depend upon various factors, such as identity of the polyelectrolyte polymers, concentration of the polymers and salt in the deposition composition, rinsing, method of layering, methods of mechanical compaction, etc. The above values are exemplary. They show, however, the substantial increase in the elastic modulus of polyelectrolyte complex materials that may be achieved according to the method of the present invention.

Polyelectrolytes for Complexes

The charged polymers (i.e., polyelectrolytes) used to form the complexes are water and/or organic soluble and comprise one or more monomer repeat units that are positively or negatively charged. The polyelectrolytes used in the present invention may be copolymers that have a combination of charged and/or neutral monomers (e.g., positive and neutral; negative and neutral; positive and negative; or positive, negative, and neutral). Regardless of the exact combination of charged and neutral monomers, a polyelectrolyte of the present invention is predominantly positively charged or predominantly negatively charged and hereinafter is referred to as a "positively-charged polyelectrolyte" or a "negatively-charged polyelectrolyte," respectively.

Alternatively, the polyelectrolytes can be described in terms of the average charge per repeat unit in a polymer chain. For example, a copolymer composed of 100 neutral and 300 positively charged repeat units has an average charge of 0.75 (3 out of 4 units, on average, are positively charged). As another example, a polymer that has 100 neutral, 100 negatively charged, and 300 positively charged repeat units would have an average charge of 0.4 (100 negatively charged units cancel 100 positively charged units leaving 200 positively charged units out of a total of 500 units). Thus, a positively-charged polyelectrolyte has an average charge per repeat unit between 0 and 1 and a negatively-charged polyelectrolyte has an average charge per repeat unit between 0 and −1. An example of a positively-charged copolymer is PDADMA-co-PAC (i.e., poly(diallyldimethylammonium chloride) and polyacrylamide copolymer) in which the PDADMA units have a charge of 1 and the PAC units are neutral so the average charge per repeat unit is less than 1.

Some polyelectrolytes comprise equal numbers of positive repeat units and negative repeat units distributed throughout the polymer in a random, alternating, or block sequence. These polyelectrolytes are termed "amphiphilic" polyelectrolytes. For examples, a polyelectrolyte molecule may comprise 100 randomly distributed styrene sulfonate repeat units (negative) and 100 diallyldimethylammonium chloride repeat units (positive), said molecule having a net charge of zero.

Some polyelectrolytes comprise a repeat unit that has both a negative and positive charge. Such repeat units are termed "zwitterionic" and the polyelectrolyte is termed a "zwitterionic polyelectrolyte." Though zwitterionic repeat units contribute equal number of positive and negative repeat units, the zwitterionic group is still solvated and relatively hydrophilic. An example of a zwitterionic repeat unit is 3-[2-(acrylamido)-ethyldimethyl ammonio]propane sulfonate, AEDAPS. Zwitterionic groups are present on polyelectrolytes as blocks or randomly dispersed throughout the polymer chain. Preferably, polyelectrolytes comprise between about 1% and about 90% zwitterions units, and more preferably said polyelectrolyte comprises between about 10% and about 70% zwitterionic units. Preferred compositions of polyelectrolytes comprising zwitterionic repeat units also comprise between about 10% and about 90% non-zwitterionic charged repeat units.

The charges on a polyelectrolyte may be derived directly from the monomer units, or they may be introduced by chemical reactions on a precursor polymer. For example, PDADMA is made by polymerizing diallyldimethylammonium chloride, a positively charged water soluble vinyl monomer. PDADMA-co-PAC is made by the polymerization of a mixture of diallyldimethylammonium chloride and acrylamide (a neutral monomer which remains neutral in the polymer). Poly(styrenesulfonic acid) is often made by the sulfonation of neutral polystyrene. Poly(styrenesulfonic acid) can also be made by polymerizing the negatively charged styrene sulfonate monomer. The chemical modification of precursor polymers to produce charged polymers may be incomplete and typically result in an average charge per repeat unit that is less than 1. For example, if only about 80% of the styrene repeat units of polystyrene are sulfonated, the resulting poly(styrenesulfonic acid) has an average charge per repeat unit of about −0.8.

Examples of a negatively-charged synthetic polyelectrolyte include polyelectrolytes comprising a sulfonate group ($-SO_3^-$), such as poly(styrenesulfonic acid) (PSS), poly(2-acrylamido-2-methyl-1-propane sulfonic acid) (PAMPS), sulfonated poly (ether ether ketone) (SPEEK), poly(ethylenesulfonic acid), poly(methacryloxyethylsulfonic acid), their salts, and copolymers thereof; polycarboxylates such as poly (acrylic acid) (PAA) and poly(methacrylic acid), polyphosphates, and polyphosphonates.

Examples of a positively-charged synthetic polyelectrolyte include polyelectrolytes comprising a quaternary ammonium group, such as poly(diallyldimethylammonium chloride) (PDADMA), poly(vinylbenzyltrimethylammonium) (PVBTA), ionenes, poly(acryloxyethyltrimethyl ammonium chloride), poly(methacryloxy(2-hydroxy)propyltrimethyl ammonium chloride), and copolymers thereof; polyelectrolytes comprising a pyridinium group such as poly(N-methylvinylpyridinium) (PMVP), including poly(N-methyl-2-vinylpyridinium) (PM2VP), other poly(N-alkylvinylpyridines), and copolymers thereof; protonated polyamines such as poly(allylaminehydrochloride) (PAH) and polyethyleneimine (PEI); polysulfoniums, and polyphosphoniums.

Exemplary polyelectrolyte repeat units, both positively charged and negatively charged, are shown in Table I.

TABLE I

Polyelectrolyte Repeat Units

| Name | Structure |
| --- | --- |
| Diallyldimethylammonium (PDADMA) | |
| Styrenesulfonic acid (PSS) | |
| N-methyl-2-vinyl pyridinium (PM2VP) | |
| N-methyl-4-vinylpyridinium (PM4VP) | |
| N-octyl-4-vinylpyridinium (PNO4VP) | |
| N-methyl-2-vinyl pyridinium-co-ethyleneoxide (PM2VP-co-PEO) | X and Y denote proportions of repeat units |
| Acrylic acid (PAA) | |
| Allylamine (PAH) | |

TABLE I-continued

Polyelectrolyte Repeat Units

| Name | Structure |
| --- | --- |
| Ethyleneimine (PEI) | 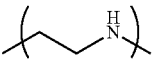 |

Further examples of oppositely-charged polyelectrolytes include charged biomacromolecules, which are naturally occurring polyelectrolytes, or synthetically modified charged derivatives of naturally occurring biomacromolecules, such as modified celluloses, chitosan, or guar gum. A positively-charged biomacromolecule comprises a protonated sub-unit (e.g., protonated amines). Some negatively charged biomacromolecules comprise a deprotonated sub-unit (e.g., deprotonated carboxylates or phosphates). Examples of biomacromolecules which may be charged for use in accordance with the present invention include proteins, polypeptides, enzymes, DNA, RNA, heparin, alginic acid, chondroitin sulfate, chitosan, chitosan sulfate, cellulose sulfate, polysaccharides, dextran sulfate, carrageenin, sulfonated lignin, hyaluronic acid and carboxymethylcellulose.

Natural, or biological, polyelectrolytes typically exhibit greater complexity in their structure than synthetic polyelectrolytes. For example, proteins may comprise any combination of about 2 dozen amino acid building blocks. Polymeric nucleic acids such as DNA and RNA may also comprise many different monomer repeat units. The sign and magnitude of the charge on proteins depends on the solution pH, as the charge on proteins is carried by weak acids, such as carboxylates (—COOH), or weak bases, such as primary, secondary, and tertiary amines. Thus, at high pH (basic conditions) amines are deprotonated and uncharged, and carboxylate groups are deprotonated and charged. At low pH (acidic conditions) amines are protonated and charged, and carboxylate groups are protonated and uncharged. For proteins, there is a pH at which there are equal numbers of positive and negative charges on the biomolecule, and it is thus electrically neutral. This is termed the isoelectric point, or pI. At pH above the isoelectric point, the protein has a net negative charge and at pH below pI, proteins bear a net positive charge. Proteins that tend to have a preponderance of positive charge at physiological pH, characterized by a high pI, are often termed "basic" proteins, and proteins with a low pI are called "acidic" proteins.

The molecular weight (number average) of synthetic polyelectrolyte molecules is typically about 1,000 to about 5,000,000 grams/mole, preferably about 10,000 to about 1,000,000 grams/mole. The molecular weight of naturally occurring polyelectrolyte molecules (i.e., biomacromolecules), however, can reach as high as 10,000,000 grams/mole. The polyelectrolyte typically comprises about 0.01% to about 40% by weight of a polyelectrolyte solution, and preferably about 1% to about 20% by weight.

Many of the foregoing polymers/polyelectrolytes, such as PDADMA and PEI, exhibit some degree of branching. Branching may occur at random or at regular locations along the backbone of the polymer. Branching may also occur from a central point and in such a case the polymer is referred to as a "star" polymer, if generally linear strands of polymer emanate from the central point. If, however, branching continues to propagate away from the central point, the polymer is referred to as a "dendritic" polymer. Branched polyelectrolytes, including star polymers, comb polymers, graft polymers, and dendritic polymers, are also suitable for purposes of this invention. Block polyelectrolytes, wherein a macromolecule comprises at least one block of charged repeat units, are also suitable. The number of blocks may be 2 to 5. Preferably, the number of blocks is 2 or 3. If the number of blocks is 3 the block arrangement is preferably ABA.

Many of the foregoing polyelectrolytes have a very low toxicity. In fact, poly(diallyldimethylammonium chloride), poly(2-acrylamido-2-methyl-1-propane sulfonic acid) and their copolymers are used in the personal care industry, e.g., in shampoos. Also, because the polyelectrolytes used in the method of the present invention are synthetic or synthetically modified natural polymers, their properties (e.g., charge density, viscosity, water solubility, and response to pH) may be tailored by adjusting their composition.

By definition, a polyelectrolyte solution comprises a solvent. An appropriate solvent is one in which the selected polyelectrolyte is soluble. Thus, the appropriate solvent is dependent upon whether the polyelectrolyte is considered to be hydrophobic or hydrophilic. A hydrophobic polymer displays a less favorable interaction energy with water than a hydrophilic polymer. While a hydrophilic polymer is water soluble, a hydrophobic polymer may only be sparingly soluble in water, or, more likely, insoluble in water. Likewise, a hydrophobic polymer is more likely to be soluble in organic solvents than a hydrophilic polymer. In general, the higher the carbon to charge ratio of the polymer, the more hydrophobic it tends to be. For example, polyvinyl pyridine alkylated with a methyl group (PNMVP) is considered to be hydrophilic, whereas polyvinyl pyridine alkylated with an octyl group (PNOVP) is considered to be hydrophobic. Thus, water is preferably used as the solvent for hydrophilic polyelectrolytes and organic solvents such as ethanol, methanol, dimethylformamide, acetonitrile, carbon tetrachloride, and methylene chloride are preferably used for hydrophobic polyelectrolytes. Since some solvents are known to be incompatible with some plastic materials, preferred solvents for depositing polyelectrolyte complex thin films on plastics are water and alcohols. Preferred solvents are aqueous.

Examples of polyelectrolytes that are soluble in water include poly(styrenesulfonic acid), poly(2-acrylamido-2-methyl-1-propane sulfonic acid), sulfonated lignin, poly(ethylenesulfonic acid), poly(methacryloxyethylsulfonic acid), poly(acrylic acids), poly(methacrylic acids), their salts, and copolymers thereof; as well as poly(diallyldimethylammonium chloride), poly(vinylbenzyltrimethylammonium), ionenes, poly(acryloxyethyltrimethyl ammonium chloride), poly(methacryloxy(2-hydroxy)propyltrimethyl ammonium chloride), and copolymers thereof; and polyelectrolytes comprising a pyridinium group, such as, poly(N-methylvinylpyridium), and protonated polyamines, such as, poly(allylamine hydrochloride) and poly(ethyleneimine).

Examples of polyelectrolytes that are soluble in non-aqueous solvents, such as ethanol, methanol, dimethylformamide, acetonitrile, carbon tetrachloride, and methylene chloride include poly(N-alkylvinylpyridines), and copolymers thereof in which the alkyl group is longer than about 4 carbon atoms. Other examples of polyelectrolytes soluble in organic solvents include poly(styrenesulfonic acid), poly(diallyldimethylammonium chloride), poly(N-methylvinylpyridinium) and poly(ethyleneimine) where the small polymer counterion, such as chloride or bromide, has been replaced by a large hydrophobic counterion such as tetrabutyl ammonium, tetraethyl ammonium, iodine, hexafluorophosphate, tetrafluoroborate, or trifluoromethane sulfonate.

The charged polyelectrolyte may be a synthetic copolymer comprising pH sensitive repeat units, pH insensitive repeat units, or a combination of pH sensitive repeat units and pH insensitive repeat units. pH insensitive repeat units maintain the same charge over the working pH range of use. The rationale behind such a mixture of pH sensitive groups and pH insensitive groups on the same molecule is that the pH insensitive groups interact with other, oppositely-charged pH insensitive groups on other polymers, holding the multilayer together despite the state of ionization of the pH sensitive groups.

It is understood that the term "pH sensitive," as applied to functional groups, refers to functional groups that exhibit differing degrees of ionization over the working pH range of the experiment, while pH insensitive refers to functional groups that maintain the same charge (either positive or negative) over the working pH range of the experiment.

For example, poly(acrylic acids) and derivatives begin to take on a negative charge within the range of about pH 4 to about 6 and are negatively charged at higher pH levels. Below this transition pH range, however, poly(acrylic acids) are protonated (i.e., uncharged). Similarly, polyamines and derivative thereof take on a positive charge if the pH of the solution is below their $pK_a$. As such, and in accordance with the present invention, the pH of a polyelectrolyte solution may be adjusted by the addition of an acid and/or base in order to attain, maintain, and/or adjust the electrical charge of a polyelectrolyte at the surface of, or within, a polyelectrolyte complex.

The state of ionization, or average charge per repeat unit, for polyelectrolytes bearing pH sensitive groups depends on the pH of the solution. For example, a polyelectrolyte comprising 100 pH insensitive positively charged units, such as DADMA, and 30 pH sensitive negatively charged units, such as acrylic acid, AA, will have a net charge of +100 at low pH (where the AA units are neutral) and an average of +100/130 charge per repeat unit; and a net charge of +70 at high pH (where 30 ionized AA units cancel out 30 of the positive charges) and an average of +70/130 charge per repeat unit. The different monomer units may be arranged randomly along the polymer chain ("random" copolymer) or they may exist as blocks ("block" copolymer). The average charge per repeat unit is also known as the "charge density."

pH sensitive polyelectrolyte complexes comprise pH sensitive polymeric repeat units, selected for example, from moieties containing carboxylates, pyridines, imidazoles, piperidines, phosphonates, primary, secondary and tertiary amines, and combinations thereof. Therefore, preferred polyelectrolytes used in accordance with this invention include copolymers comprising carboxylic acids, such as poly (acrylic acids), poly(methacrylic acids), poly(carboxylic acids), and copolymers thereof. Additional preferred polyelectrolytes comprise protonatable nitrogens, such as poly (pyridines), poly(imidazoles), poly(piperidines), and poly (amines) bearing primary, secondary or tertiary amine groups, such as poly(allylamine).

To avoid disruption and possible decomposition of the polyelectrolyte complex, polyelectrolytes comprising pH sensitive repeat units additionally comprise pH insensitive charged functionality on the same molecule. In one embodiment, the pH-insensitive repeat unit is a positively charged repeat unit selected from the group consisting of repeat units containing a quaternary nitrogen atom, a sulfonium ($S^+$) atom, or a phosphonium atom. Thus, for example, the quaternary nitrogen may be part of a quaternary ammonium moiety ($—N^+R_aR_bR_c$ wherein $R_a$, $R_b$, and $R_c$ are independently alkyl, aryl, or mixed alkyl and aryl), a pyridinium moiety, a bipyridinium moiety or an imidazolium moiety, the sulfonium atom may be part of a sulfonium moiety ($—S^+$ $R_dR_e$ wherein $R_d$ and $R_e$ are independently alkyl, aryl, or mixed alkyl and aryl) and the phosphonium atom may be part of a phosphonium moiety ($—P^+R_fR_gR_h$ wherein $R_f$, $R_g$, and $R_h$ are independently alkyl, aryl, or mixed alkyl and aryl). In another embodiment, the pH-insensitive repeat unit is a negatively charged repeat unit selected from the group consisting of repeat units containing a sulfonate ($—SO_3^-$), a phosphate ($—OPO_3^-$), or a sulfate ($—SO_4^-$).

Exemplary negatively charged pH insensitive charged repeat units include styrenesulfonic acid, 2-acrylamido-2-methyl-1-propane sulfonic acid, sulfonated lignin, ethylenesulfonic acid, methacryloxyethylsulfonic acid, sulfonated ether ether ketone, phosphate. Preferred pH insensitive negatively charged polyelectrolytes include polyelectrolytes comprising a sulfonate group ($—SO_3^-$), such as poly(styrenesulfonic acid) (PSS), poly(2-acrylamido-2-methyl-1-propane sulfonic acid) (PAMPS), sulfonated poly (ether ether ketone) (SPEEK), sulfonated lignin, poly(ethylenesulfonic acid), poly(methacryloxyethylsulfonic acid), their salts, and copolymers thereof.

Exemplary positively charged pH insensitive repeat units include diallyldimethylammonium, vinylbenzyltrimethylammonium, ionenes, acryloxyethyltrimethyl ammonium chloride, methacryloxy(2-hydroxy)propyltrimethyl ammonium, N-methylvinylpyridinium, other N-alkylvinyl pyridiniums, a N-aryl vinyl pyridinium, alkyl- or aryl imidazolium, sulfonium, or phosphonium. Preferred pH insensitive positively-charged polyelectrolytes comprising a quaternary ammonium group, such as poly(diallyldimethylammonium chloride) (PDADMA), poly(vinylbenzyltrimethylammonium) (PVBTA), ionenes, poly(acryloxyethyltrimethyl ammonium chloride), poly(methacryloxy(2-hydroxy)propyltrimethyl ammonium chloride), and copolymers thereof; polyelectrolytes comprising a pyridinium group such as poly (N-methylvinylpyridinium) (PMVP), other poly(N-alkylvinylpyridines), and copolymers thereof.

For illustrative purposes, certain of the pH insensitive positively-charged moieties are illustrated below:

Pyridinium having the structure:

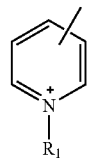

wherein $R_1$ is optionally substituted alkyl, aryl, alkaryl, alkoxy or heterocyclo. Preferably, $R_1$ is alkyl or aryl, and still more preferably $R_1$ is methyl.

Imidazolium having the structure:

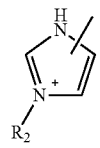

wherein $R_2$ is optionally substituted alkyl, aryl, alkaryl, alkoxy or heterocyclo. Preferably, $R_2$ is alkyl or aryl, and still more preferably $R_2$ is methyl.

Bipyridinium having the structure:

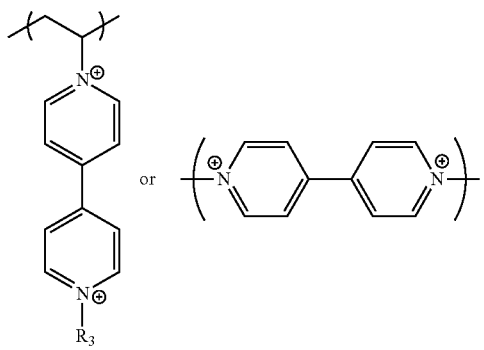

wherein $R_3$ and $R_4$ are optionally substituted alkyl, aryl, alkaryl, alkoxy or heterocyclo. Preferably, $R_3$ and $R_4$ are alkyl or aryl, and still more preferably $R_3$ is methyl.

The pH insensitive polyelectrolyte may comprise a repeat unit that contains protonatable functionality, wherein the functionality has a pKa outside the range of experimental use. For example, poly(ethyleneimine) has protonatable amine functionality with pKa in the range 8-10, and is thus fully charged (protonated) if the experimental conditions do not surpass a pH of about 7.

Preferably, the pH-insensitive groups constitute about 10 mol % to about 90 mol % of the repeat units of the polyelectrolyte, more preferably from about 20 mol % to about 80 mol %. Preferably, the pH-sensitive groups constitute about 30 mol % to about 70 mol % of the repeat units of the polyelectrolyte. The ratio of pH-sensitive to pH-insensitive charged repeat units comprising a polyelectrolyte molecule, or a blend of polyelectrolyte molecules, is important. Too few pH-insensitive charged repeat units may be insufficient to hold the polyelectrolyte complex together when the pH is changed. Too many charged pH-insensitive units will not yield a material that is responsive to pH. The preferred ratio of pH sensitive functional group to pH insensitive charged functional group enables control of surface and/or bulk charge without leading to disruption of the thin polyelectrolyte complex film. Thus ratios of pH sensitive functional group to pH insensitive charged functional group are preferably in the range 1:10 to 10:1, and more preferably in the range 2:10 to 10:2. Similarly, the total percentage of pH sensitive functional group is preferably between 5% and 95%.

Optionally, the polyelectrolytes comprise an uncharged repeat unit that is not pH sensitive in the operating pH range, for example, about pH 3 to about pH 9. Said uncharged repeat unit is preferably hydrophilic. Preferred uncharged hydrophilic repeat units are acrylamide, vinyl pyrrolidone, ethylene oxide, and vinyl caprolactam. The structures of these uncharged repeat units are shown in Table II.

TABLE II

| Neutral Repeat Units | |
|---|---|
| Name | Structure |
| Acrylamide | (structure) |
| Vinylpyrrolidone | (structure) |
| Ethylene oxide | (structure) |
| Vinylcaprolactam | (structure) |

Protein adsorption is driven by the net influence of various interdependent interactions between and within surfaces and biopolymer. Possible protein-polyelectrolyte interactions can arise from 1) van der Waals forces 2) dipolar or hydrogen bonds 3) electrostatic forces 4) hydrophobic effects. Given the apparent range and strength of electrostatic forces, it is generally accepted that the surface charge plays a major role in adsorption. However, proteins are remarkably tenacious adsorbers, due to the other interaction mechanisms at their disposal. It is an object of this invention to show how surfaces may be selected to encourage or discourage the adsorption of proteins to compacted polyelectrolyte complexes when they are used in vivo. Protein adsorption may be discouraged by copolymerizing with vinyl repeat units having hydrophilic groups, vinyl repeat units having zwitterionic groups, and hydrophilic repeat units.

Polyelectrolytes in complexes may be additionally held together by hydrogen bonding. The hydrogen bond interaction is not disrupted by the addition of salt. For example, Sukhishvili (Macromolecules, 35, 301-310, (2002)) discloses multilayers prepared from combinations of polyacids and polybases or polydonors and polyacceptors. Preferred polyacids are polycarboxylic acids, such as poly(acrylic acid) and poly(methacrylic acid) and preferred polybases are poly(vinylpyrrolidone) and poly(ethylene oxide). Accordingly, polyelectrolytes used to form complexes for this invention optionally further comprise hydrogen bonding units. Multilayers can be prepared using pairs or combinations of neutral polymers that interact via hydrogen bonding. These multilayers may also be compacted by the action of a preferred osmolyte.

In one embodiment of this invention, compacted polyelectrolyte complex articles also comprise zwitterionic functional groups. It has been found that polymers comprising zwitterionic functional groups alone do not form polyelectrolyte complexes if they are employed under conditions that maintain their zwitterionic character. This is because the charges on zwitterionic groups do not exhibit intermolecular interactions. Therefore, preferred polymers comprising zwitterionic groups also comprise additional groups capable of intermolecular interactions, such as hydrogen bonding or ion pairing. More preferably, polyelectrolytes comprising zwitterionic groups also comprise charged groups that are not zwitterionic. For control of bulk and surface charge of polyelectrolyte complexes, polyelectrolytes comprising zwitterionic groups also comprise pH sensitive units. These pH sensitive units are preferably acrylic acids, methacrylic acids, carboxylic acids, and copolymers thereof, and protonatable nitrogens, such as pyridines, imidazoles, piperidines, and primary, secondary, or tertiary amine groups, such as allylamine. Zwitterionic groups are present on polyelectrolytes as blocks or randomly dispersed throughout the polymer chain. Preferably, polyelectrolytes comprise between about 1% and about 90% zwitterions units, and more preferably said polyelectrolyte comprises between about 10% and about 70% zwitterionic units. Preferred compositions of polyelectrolytes comprising zwitterionic repeat units also comprise between about 10% and about 90% non-zwitterionic charged repeat units. Preferred zwitterionic repeat units are poly(3-[2-(acrylamido)-ethyldimethyl ammonio]propane sulfonate) (PAEDAPS) and poly(N-propane sulfonate-2-vinyl pyridine) (P2PSVP). The structures of these zwitterions are shown in Table III.

TABLE III

Zwitterionic Repeat Units

| Name | Structure |
| --- | --- |
| 3-[2-(acrylamido)-ethyldimethyl ammonio] propane sulfonate (AEDAPS) | 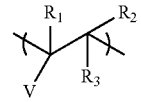 |
| N-propane sulfonate-2-vinyl pyridine (2PSVP) | 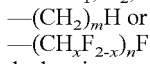 |

It has been disclosed by Graul and Schlenoff (*Anal. Chem.*, 71, 4007 (1999)) that polyelectrolyte films prepared by the multilayering method are able to control the adsorption of protein. The adsorption of basic proteins (that is, those with a positive net charge at the operating pH) is preferably minimized by terminating the polyelectrolyte complex film with a positive charge, which repels the positive proteins. It is also generally known by those skilled in the art that hydrophilic units, such as ethylene oxide (or ethylene glycol), are effective in reducing the overall propensity of biological macromolecules, or biomacromolecules, to adsorb to surfaces (see Harris, *Poly(ethylene glycol) Chemistry: Biotechnical and Biomedical Applications*, Plenum Press, New York, 1992). Yang and Sundberg (U.S. Pat. No. 6,660,367) disclose materials comprising ethylene glycol units that are effective at resisting the adsorption of hydrophilic proteins in microfluidic devices. In the present invention, copolymers of poly(ethylene oxide), PEO, or poly(ethylene glycol), PEG, are preferred materials for surface modification. The ethylene oxide (or ethylene glycol) repeat units are preferably present as blocks within a block copolymer. Preferably, the block copolymer also comprises blocks of charged repeat units, allowing the material to be incorporated into a polyelectrolyte complex. Sufficient ethylene oxide repeat units are required to promote resistance to protein adsorption, but too many ethylene oxide units do not allow polyelectrolyte complexes to associate. Therefore, the preferred ratio of charged to neutral blocks in a polyelectrolyte complex from 10:1 to 1:4, and a more preferred ratio is 5:1 to 1:2.

In some applications, the compacted article comprises polyelectrolyte that renders the article biocompatible. Preferred polyelectrolyte film coatings for biocompatibility comprise fluorinated polymers, preferably fluorinated polyelectrolytes. See, for example, U.S. Pub. No. 2005/0287111, the entire contents of which are hereby incorporated in their entirety. Fluorinated polyelectrolytes are preferably copolymers, or copolyelectrolytes, comprising fluorinated and non-fluorinated repeat units. Said repeat units may be disposed in a random or block fashion on the backbone of said copolyelectrolytes. Preferred fluorinated copolyelectrolytes comprise charged non-fluorinated with noncharged fluorinated repeat units, or charged fluorinated with noncharged nonfluorinated repeat units. Other preferred fluorinated polyelectrolytes comprise charged fluorinated repeat units with charged nonfluorinated repeat units. Fluorinated copolyelectrolytes are preferably made by post-polymerization reactions on polymers, such as alkylation, or by polymerization of fluorinated monomers or mixtures of fluorinated monomers. Mole percentages of fluorinated repeat units on fluorinated copolyelectrolytes are preferably from 10% to 95%, and more preferably from 20% to 95%.

For illustrative purposes, certain fluorinated moieties are shown as vinyl repeat units:
Vinyl Polymer Repeat Unit

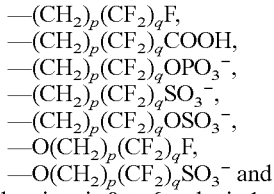

wherein $R_1$, $R_2$, and $R_3$ are each independently:
—$(CH_2)_m H$ or
—$(CH_x F_{2-x})_n F$
and wherein m and n are independently 0 to 12, x is 0, 1, or 2 and V is selected from among the following:
fluorinated hydrocarbons selected from among:
—$(CH_2)_p(CF_2)_q F$,
—$(CH_2)_p(CF_2)_q COOH$,
—$(CH_2)_p(CF_2)_q OPO_3^-$,
—$(CH_2)_p(CF_2)_q SO_3^-$,
—$(CH_2)_p(CF_2)_q OSO_3^-$,
—$O(CH_2)_p(CF_2)_q F$,
—$O(CH_2)_p(CF_2)_q SO_3^-$ and
wherein p is 0 to 6 and q is 1 to 21;
fluorinated amides having the structure:

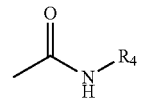

wherein $R_4$ is selected from among the following:
—$(CH_2)_p(CF_2)_q F$,
—$(CH_2)_p(CF_2)_q COOH$,
—$(CH_2)_p(CF_2)_q OPO_3^-$,
—$(CH_2)_p(CF_2)_q SO_3^-$,
—$(CH_2)_p(CF_2)_q OSO_3^-$ and wherein p is 0 to 6 and q is 1 to 21;

fluorinated esters having the structure:

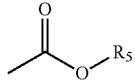

wherein $R_5$ is selected from among the following:

—$(CH_2)_p(CF_2)_qF$,

—$(CH_2)_p(CF_2)_qCOOH$,

—$(CH_2)_p(CF_2)_qOPO_3^-$,

—$(CH_2)_p(CF_2)_qSO_3^-$,

—$(CH_2)_p(CF_2)_qOSO_3^-$ and wherein p is 0 to 6 and q is 1 to 21;

a fluorinated phenyl groups having the structure:

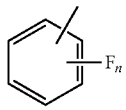

wherein n is 2 to 5;

a fluorinated phenyl groups having the structure:

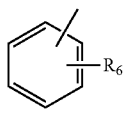

wherein $R_6$ is —$(CH_2)_p(CF_2)_qF$ or —$O(CH_2)_p(CF_2)_qF$ and wherein p is 0 to 6 and q is 1 to 21;

fluorinated pyridiniums having the structure:

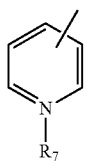

wherein $R_7$ is —$(CH_2)_p(CF_2)_qF$ and wherein p is 0 to 6 and q is 1 to 21;

fluorinated imidazoliums having the structure:

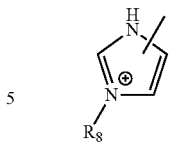

wherein $R_8$ is —$(CH_2)_p(CF_2)_qF$ and wherein p is 0 to 6 and q is 1 to 21;

fluorinated quaternary nitrogens having the structure:

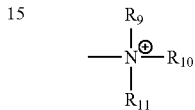

wherein $R_9$, $R_{10}$, and $R_{11}$ are each independently —$(CH_2)_p(CF_2)_qF$ and wherein p is 0 to 6 and q is 1 to 21 or -aryl$F_z$ wherein z is 2 to 8;

fluorinated sulfoniums having the structure:

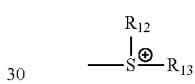

wherein $R_{12}$ and $R_{13}$ are each independently —$(CH_2)_p(CF_2)_qF$ wherein p is 0 to 6 and q is 1 to 21 or -aryl$F_z$ wherein z is 2 to 8; and fluorinated phosphoniums having the structure:

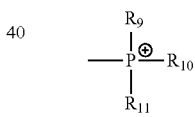

wherein $R_{14}$, $R_{15}$, and $R_{16}$ are each independently —$(CH_2)_p(CF_2)_qF$ wherein p is 0 to 6 and q is 1 to 21 or -aryl$F_z$ where z=2 to 8.

For illustrative purposes, certain of these moieties are shown as allyl repeat units (e.g., PDADMA):

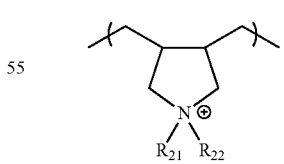

wherein $R_{21}$ and $R_{22}$ are —$(CH_2)_p(CF_2)_qF$, wherein p and q are independently selected for $R_{21}$ and $R_{22}$, and p is 0 to 6 and q is 1 to 21.

Table IV shows the structures of fluorinated polyelectrolytes that may be present in the compacted polyelectrolyte complex articles of the present invention.

TABLE IV

Fluorinated Polyelectrolyte Repeat Units

| Name | Structure |
| --- | --- |
| 4-vinyl-trideca-fluoro-octyl pyridinium iodide-co-4-vinyl pyridine (PFPVP) | 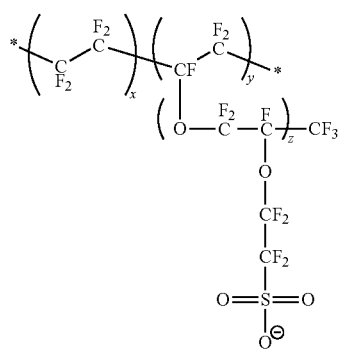<br>Where M is a mole fraction typically from about 0.1 to about 1.0, preferably from about 0.3 to about 0.8 |
| NAFION | Where X, Y, and X denote molar proportions; X may be from about 6 to about 10 parts, Y may be about 1 part and Z may be from about 1 to about 3 parts |

Other biocompatible polymers comprise sequences of peptides that are suited to interaction with cells, antibodies, or antigens. One such sequence is the RDG sequence that is known to promote cell adhesion. Other biological macromolecules, such as growth factors, are known to stimulate differentiation or growth of cells.

Salt Content

In general, salt ions may be incorporated within the bulk of the article both during preparation of the polyelectrolyte complex and during compaction. Typically, the concentration of salt ions within the bulk of the article equilibrates with the salt ion concentration of the solution in which the polyelectrolyte complex is prepared or the solution in which the article is compacted. Equilibration may be fairly rapid, with durations typically on the order of between about 1 minute and about 30 minutes per millimeter thickness of the polyelectrolyte complex or compacted polyelectrolyte complex article. In general, the salt ions located within the bulk of the polyelectrolyte complex associate with (i.e., form ionic bonds to) charged repeat units located in the positively charged and negatively charged polyelectrolytes. The salt ion concentration within the bulk of the compacted article comprising polyelectrolyte complex may be quantified in terms of a doping level ratio, determined by dividing the sum of the ionic charge provided by salt ions by the sum of charge provided by the polymer repeat units. This ratio may be expressed in terms of a doping level percentage by multiplying the doping level ratio by 100. The doping level ratio is typically between about 0.01 to about 0.50 (in percentage terms, from about 1% to about 50%) in complexes and depends strongly on sample history and composition. We have found that compacted articles prepared by the methods described in PCT Publication No. WO/2008/027989 yield compact articles that contain excess water and counterions. In particular, it was found, by elemental analysis, that the complex contained about 20 mol % more PSS in a PDADMA/PSS complex article. Such non-stoichiometry of positive and negative polyelectrolytes leads to counterions trapped within the article and also to large amounts of water within the material. It is believed that this excess water is responsible for the inability of the complexes compacted as described in PCT application WO/2008/027989 to reach their maximum modulus.

Methods of Preparation of Articles Comprising Polyelectrolyte Complex Multilayers One method for preparing articles in the form of a film or other body of a polyelectrolyte complex is by the alternating layer-by-layer deposition method. The preferred concentration of polyelectrolytes in solutions used to deposit in this manner is in the range 0.01 weight % to 10 weight %, and preferably 0.1 weight % to 1 weight %. The polyelectrolyte complex may be prepared by alternately exposing a surface of a substrate to two or more solutions, each comprising a polyelectrolyte until a polyelectrolyte complex of a desired thickness, typically from about 100 nm to about 10,000 nm, is reached. These thicknesses may be typically be achieved by alternately layering between about two and about 1000 nominal layers of polyelectrolyte. At least one solution comprises a predominantly positively charged polyelectrolyte and at least one solution comprises a predominantly negatively charged polyelectrolyte. The alternating polyelectrolyte layering method, however, does not generally result in a layered morphology of the polymers with the film. Rather, the polymeric components interdiffuse and mix on a molecular level upon incorporation into the thin film. See Lösche et al., *Macromolecules* 31, 8893 (1998). The complexed polyelectrolyte within the film has similar morphology as a polyelectrolyte complex formed by mixing solutions of positive and negative polyelectrolyte followed by ultracentrifugation in the presence of salt, as described in the present invention. These polyelectrolyte complex films rarely exceed 1 μm in thickness. While they have sufficient thickness to dampen vibrations between two abutting surfaces separated by a submicron distance, they will typically have insufficient thickness to be used in damping application for macroscopic samples (i.e. of mm or cm dimensions).

For many applications, therefore, thicker polyelectrolyte films may be inserted between two abutting surfaces to dampen vibrations. These thicker films may be prepared in accordance with one method of the present invention. In general, larger quantities of polyelectrolyte complex are typically prepared by combining separate solutions, each containing one of the polyelectrolytes. At least one solution comprises a predominantly positively-charged polyelectrolyte, and at least one solution comprises a predominantly negatively-charged polyelectrolyte. The solutions are combined in a manner that allows the positively-charged polyelectrolyte and the negatively-charged polyelectrolyte to intermix. Intermixing the respective polyelectrolytes causes the in situ formation of a polyelectrolyte complex comprising an intermolecular blend of the positively-charged polyelectrolyte and the negatively-charged polyelectrolyte. Preferably, at least one of the solutions comprises salt ions, such that salt ions also intermix with and become part of the polyelectrolyte complex. The resulting polyelectrolyte complex may simply be allowed to precipitate and settle to the bottom of the container. The supernatant is, in a preferred embodiment, separated to the extent possible from the polyelectrolyte complex.

In addition, a substantially compacted article may be obtained by centrifugation of a polyelectrolyte complex preparing by multilayering or solution mixing at high rates, and particularly in the presence of salt. When a complex is processed thus, it turns from an opaque, gelatinous, diffuse material into a solid plug. The plug may be removed and cut into a preferred shape with a razor blade. Accordingly, compacting the polyelectrolyte complex precipitate formed by the intermixing method preferably occurs in a centrifuge capable of obtaining a high rotation rate and g-force. Preferably, the centrifuge is powerful enough to compact the polyelectrolyte complex into a plug, adopting the contours of the centrifuge vessel. Preferably, said vessel is shaped to produce a compacted article of the preferred geometry. More preferably, compaction occurs in the presence of a salt, which enhances the ability of the centrifuge to compact the polyelectrolyte complex. The optimum centrifuging time is a function of the rotor size, defined as the distance between the axis of rotation and the bottom of the centrifuge tube while in motion, the rotation rate, the centrifuging time, the salt concentration, the salt composition, the polyelectrolyte types, the temperature, and the solvent. If pH-dependent groups are present, the centrifuge time for compaction also depends on the solution pH. The combination of rotor size and rotation rate is often combined into a single g-force quantity, where the rotational centrifuge force, RCF, in units of g, is given by $RCF = 1.12 \times 10^{-5} rN^2$, where r is the radius (cm) of the rotor and N is the rotational speed (rpm). A variety of salts, comprising monovalent or polyvalent cations and/or monovalent or polyvalent anions, may be used during the centrifugal compaction process. Preferably, the salt is NaCl. The salt may be present at the polyelectrolyte precipitation stage, or it may be present at the centrifugation stage. Preferably, a lower concentration of salt is present during precipitation, for example in the range of 0.1M, and a higher concentration is present during centrifugation, in the range of 1.0 M.

The method of the present invention enables the incorporation of a wide variety of additives into the bulk of the compacted article comprising polyelectrolyte complexes. For example, articles that are to be implanted in vivo may optionally further comprise antibacterial and/or anti-inflammation and/or antirejection agents. These additives respectively aid in reducing infection, inflammation or rejection of the implanted article. Examples of antibiotics are well known to the art and are to be found in E. M. Scholar, The antimicrobial drugs, New York, Oxford University Press, 2000 or the Gilbert et al., The Stanford Guide to Antimicrobial Therapy, Hyde Park, Vt., 2000, or the R. Reese, Handbook of Antibiotics, Philadelphia, Lippincot, 2000. Antibacterial agents include silver. These additives may be incorporated prior to precipitation, prior to centrifugation, or after centrifugation. Preferably, the additives are mixed with the polyelectrolytes before the precipitation stage. The advantage of introducing additives prior to precipitation is that the additives are incorporated throughout the polyelectrolyte complex. On the other hand, if minimizing the waste of additive is a concern, the additives are added during centrifugation, after much of the supernatant liquid is poured off.

Water Content

The polymeric constituents of polyelectrolyte complexes are highly charged and hydrophilic, and although the individual charged units are less hydrophilic when ion paired within the article, each ion pair is solvated. Accordingly, when in contact with water at room temperature (25° C.), a compacted article comprising polyelectrolyte complex (e.g., a centrifugally compacted polyelectrolyte complex prior to osmotic compaction) may comprise anywhere from about 5 wt. % to about 90 wt. % water, typically between about 10 wt. % and about 70 wt. % water at room temperature, typically more than 30 wt. % water, and even more typically more than 50 wt. % water. An exemplary compacted article comprising polyelectrolyte complex, in the form of an ultrathin multilayer, comprising poly(diallyldimethylammonium) and poly (styrene sulfonate), for example, may comprise between about 40 and about 70 wt % water. See Dubas and Schlenoff, "Swelling and Smoothing in Polyelectrolyte Multilayers", Langmuir 2001, 17, 7725. The water content of an article of centrifugally compacted solution precipitated polyelectrolyte complex of the same polyelectrolytes is even higher, approaching 70-90% by weight.

Water content within the bulk of the compacted article is thought to enhance the article's damping ability to a point. Polyelectrolyte complexes prepared by precipitation and centrifugation at relatively low centrifugation rates (e.g. 5,000 rpm), however, may contain too much water. For example, a PDADMA/PSS complex precipitated and centrifuged at 5,000 rpm on a 20 cm radius rotor arm for 30 min contained more than 90 wt % water and it had a shear modulus which was less than desirable and the sample could neither be formed into a shape nor loaded into a rheometer. In general, therefore, it is preferred that the water content be less than about 85 wt. %, more preferably below about 80 wt. %, even more preferably below about 70 wt. % (when the polyelectrolyte complex is in contact with aqueous solutions, for example a 0.15 M salt solution, at room temperature (25° C.)). To attain the advantages of enhanced damping, it is preferred that the water content be at least about 10 wt. %, preferably at least about 20 wt. %, more preferably at least about 30 wt. %, even more preferably at least about 50 wt. % (when the polyelectrolyte complex is in contact with aqueous solutions, for example a 0.15 M salt solution, at room temperature (25° C.). However, water content compromises the ultimate strength of a complex. Thus, when using the same polyelectrolytes, a multilayer has higher modulus than a centrifugally compacted complex because the former has less water. It is an object of this invention to further reduce the water content to a minimum.

Methods of Osmotic Compaction

Within the present invention, it has been found that the exposure of an article comprising polyelectrolyte complex (prepared, e.g., by the alternating layer-by-layer method as described above and optionally, compacted polyelectrolyte complex article prepared e.g., by centrifugation of a polyelectrolyte complex as described above) to certain solutions of high osmotic pressure will lead to additional compaction of the polyelectrolyte complex or compacted article comprising polyelectrolyte complex. In this regard, a polyelectrolyte complex multilayer prepared by, e.g., the multilayering method described above, or a compacted polyelectrolyte complex multilayer prepared by, e.g., the multilayering method followed by centrifugal compaction, may be further compacted by exposing the polyelectrolyte complex multilayer or compacted polyelectrolyte complex multilayer to a solution of high osmotic pressure. That is, the starting material may be a polyelectrolyte complex prepared by conventional multilayering or solution mixing techniques or the starting material be such a polyelectrolyte complex that had undergone compaction. The method of the present invention is therefore directed to compacting polyelectrolyte multilayers prepared by any of the above described techniques by subjecting the polyelectrolyte multilayers to an osmotic stressing agent.

The magnitude of the increase in mechanical properties was completely unexpected. Accordingly, in some preferred embodiments, the polyelectrolyte complex preferably undergoes preliminary compaction using the methods described in PCT application WO/2008/027989, preferably by centrifugation. The centrifugation step leads to materials having low to intermediate moduli, in the kPa to MPa range, which are well adapted for damping applications. Materials with high moduli are not suited to damping because they do not absorb dissipate mechanical energy as efficiently. As an example, described in detail below, a centrifugally compacted PDAMA/PSS complex had a modulus of about 3 MPa at room temperature in water. This value is far less than a multilayer made of the same material (see Jaber, J. A.; Schlenoff, J. B. J. Am. Chem. Soc.; 2006; 128; 2940-294) which had a modulus of 17 MPa in water.

Agents that are used to generate osmotic pressure are called osmolytes. In contrast to natural (i.e. biological) systems, NaCl is not a preferred osmolyte for the present invention. Salts in general, including NaCl, are able to enter the complex, and therefore generate high internal as well as external osmotic pressures. High internal osmotic pressures prevent water from being drawn out of polyelectrolyte complex articles. Other small molecules, such as sucrose, are also commonly used to generate osmotic pressure. However, even neutral molecules, if they are small enough, are able to enter the polyelectrolyte complex. Thus, the preferred osmolyte is one that has properties such that the osmolyte molecule is inhibited from permeating the polyelectrolyte complex or compacted article comprising polyelectrolyte complex, more preferably, the osmolyte molecule is excluded from permeating the polyelectrolyte complex or compacted article comprising polyelectrolyte complex. One characteristic that has been discovered to substantially correlate to inhibiting the osmolyte from permeating the polyelectrolyte complex is molecular weight. In view thereof, preferably the osmolyte has sufficiently high molecular weight to be excluded from permeating the polyelectrolyte complex article. Preferred osmolytes include hydrophilic polymers with number average molecular weights greater than about 300, preferably greater than 500. It has been observed that the osmotic pressure for a given weight % of osmolyte decreases slowly with increasing molecular weight. In view thereof, the osmolytes preferably have a molecular weight less than about 10,000.

Preferred hydrophilic polymers are poly(ethylene oxide), poly(ethylene glycol), PEG, or polyelectrolytes. Neutral polymers such as poly(ethylene glycol) are preferred when minimal interaction with the polyelectrolyte complex is desired. A wide variety of molecular weights for PEGs are available. Preferred molecular weights for PEGs are greater than 500, but the osmotic pressure for a given weight % of PEG decreases slowly with increasing molecular weight. Thus preferred PEGs have a molecular weight of less than 10,000.

On the other hand, polyelectrolytes, including those listed above, are effective at generating high osmotic pressure. When a polyelectrolyte is used as an osmolyte, preferably the polyelectrolyte osmolyte has a predominantly negative charged when the article surface is predominantly negatively charged. Similarly, preferably the polyelectrolyte osmolyte has a predominantly positive charged when the article surface is predominantly positively charged. Polyzwitterions are also preferred osmolytes for this invention. Preferred molecular weights for highly ionic osmolytes, e.g., polycations, polyanions, polyzwitterions, also range from about 300 g/mol, such as about 500 g/mol to about 10,000 g/mol.

The preferred concentration of osmolyte depends on many factors, including the chemical composition of the polyelectrolyte complex to be compacted, the composition of the osmolyte, and the presence of salt. Specifically, we have found that there is a critical concentration of osmolyte above which significant osmotic compaction of the polyelectrolyte article proceeds. In the example given below, a minimum concentration of PEG 8,000 (i.e. poly(ethylene glycol) with a molecular weight of eight thousand) concentration of greater than about 20 wt % was required to observe compaction of a PSS/PDADMA article. In general, the preferred concentration of osmolyte depends on the preferred osmotic pressure. Osmotic pressure vs. concentration tables for many osmolytes are provided in the literature. Therefore, selection of the preferred concentration of osmolyte may be guided by the literature. If not provided in the literature, osmotic pressure may be experimentally determined by an osmometer. The preferred osmotic pressure of osmolyte is greater than the internal osmotic pressure of the article to be compacted. The internal osmotic pressure of the article depends strongly on the ion content. The internal osmotic pressure of the material is equal to the external osmotic pressure when there is no change in the water content of the material. Thus, the preferred (external) osmotic pressure of osmolyte is at least 10% greater than the internal osmotic pressure of the article. This leads to a net migration of water out of the article. Greater external osmotic pressure leads to faster compaction. Thus the external osmotic pressure is more preferably at least twice that of the internal osmotic pressure of the article.

A polyelectrolyte complex article that has been compacted by centrifugation is white, or slightly colored, and opaque. The opacity is thought to result from pockets of residual water that scatter light. Osmotic compaction of an article is very easy to observe, as one sees a transparent, amber-colored region spreading into the white PEC article from the surface. This amber skin or shell continues to expand and eventually (after a few hours for an article a few mm thick) the entire article becomes transparent, at which point the article is believed to be completely osmotically compacted and achieves its highest modulus. The article does not lose all its water, however, unless it is dried. For example, an osmotically compacted polyelectrolyte complex preferably comprises less than 30 wt. % water, such as between about 5 wt. % and about 30 wt % water when in contact with water or humid air. When dried, e.g. at elevated temperature or in a vacuum, the complex will lose more water and the modulus will increase. However, the complex becomes brittle and glassy when thoroughly dried. After drying, an article of compacted polyelectrolyte complex with mm or more thickness does not regain its original water content when placed back in water.

In general, prior to compaction by the exposure of the article comprising polyelectrolyte complex to osmotic stress, the shear modulus of a compacted article comprising polyelectrolyte complex may vary between about 1 kPa and about 400 MPa, such as between about 1 MPa and about 20 MPa, between frequencies of about 0.1 Hz and 10,000 Hz. After further compaction by exposure of the compacted article comprising polyelectrolyte complex to osmotic stress, the shear modulus of the osmotically compacted polyelectrolyte complex of the present invention may vary between about 10 kPa and about 4 GPa, such as between about 10 MPa and about 200 MPa, between frequencies of about 0.1 Hz and 10,000 Hz.

The shear modulus of the polyelectrolyte complex (i.e., prepared by multilayering or by further compaction by centrifugation, or by centrifugation and osmotic stress) depends, at least in part, on three factors: the chemical composition of polyelectrolytes, the salt ions, and the concentration of salt within the bulk of the polyelectrolyte complex. For example, $G^*$ of a polyelectrolyte multilayer (See Jaber, J. A.; Schlenoff, J. B. Chem. Mater.; 2006; 18(24); 5768-5773) comprising poly(styrene sulfonate) (PSS) and poly(diallyldimethylammonium) (PDADMA) decreases between about 2 MPa and about 0.1 MPa per 0.1 M increase in ionic concentration within the bulk of the article at about 10 Hz.

In another example, $G^*$ of a centrifugally compacted article comprising poly(methacrylic acid) and PDADMA decreases with increasing sodium chloride as shown in the following Table V. In Table V, the values of $G^*$ at various frequencies for the nucleus pulposus of the human lumbar intervertebral disc are shown for comparison. Advantageously, the viscoelastic behavior of an intervertebral disc of the pulposus may be reproduced by a centrifugally compacted poly(methacrylic acid)/poly(diallyldimethylammonium) (PMAA/PDADMA) polyelectrolyte complex article.

TABLE V

Comparison of Complex Shear Modulus Behavior of Nucleus Pulposus and Polyelectrolyte Complex

| Material | W (rad/s) | \|G*\| | Δ (deg) |
|---|---|---|---|
| Nucleus pulposus[1] | 1 | 7.40 ± 11.6 | 23 ± 5 |
| | 10 | 11.30 ± 17.9 | 24 ± 5 |
| | 100 | 19.8 ± 31.4 | 30 ± 6 |
| PMAA/PDAD 0.15M | 1 | 3.2 | 38 |
| | 10 | 7.5 | 30 |
| | 100 | 15.2 | 25 |
| PMAA/PDAD 0.00M | 1 | 7.3 | 32 |
| | 10 | 15.0 | 27 |
| | 100 | 27.2 | 23 |

[1](from J. S. Iatridis et al, J. Biomechanics, 30, p. 1005-1012 (1997)).

The intravertebral disk, however, is actually a more complex structure comprising an outer layer or shell termed the annulus fibrosis. The annulus is much tougher and higher modulus than the nucleus. The annulus essential holds the shape of the nucleus. The two combined are like a sac containing a gel, which provides flexibility and shock absorption capability.

Core-Shell Articles

In order to mimic the efficient shock absorbing properties of the intervertebral disk, one aspect of the present invention is directed to a method for forming an article comprising polyelectrolyte complex wherein the article comprises an outer region and an inner region, the outer region having a modulus that is greater than the modulus of an inner region. The outer region is termed a "shell" and the inner region is termed a "core." If the outer region is thinner than about one mm it may be considered a "skin." The core/shell morphology is obtained by the action of a solution of high osmotic pressure of a preferred osmolyte on a polyelectrolyte complex article, preferably previously compacted by centrifugation. Such core-shell morphologies cannot be achieved by any of the methods for compaction disclosed in PCT WO/2008/027989. A core-shell article is formed by exposure of a polyelectrolyte complex, preferably a compacted article comprising polyelectrolyte complex, to a solution of comprising a preferred osmolyte and terminating the osmotic compaction before the process has occurred throughout the article. For example, a PDADMA/PSS article, compacted by centrifugation, forms a skin about 1 mm in thickness when exposed to a solution of 30% PEG 8000 for about an hour. Continued exposure to the osmolyte solution will cause the skin to continue to grow in thickness, and the exposure to PEG 8000 must stop after the desired skin thickness is reached.

The skin morphology described above is not limited to articles that are completely surrounded by a shell. For example, if one portion of the polyelectrolyte complex article is not exposed to osmolyte, compaction will not proceed from that point. Thus, articles in contact with a substrate will be protected from osmotic compaction in the region where the substrate contacts the article, at least until the region of compaction has spread throughout the article. A thin film of polyelectrolyte complex on a substrate, for example, when exposed to a preferred osmolyte for a sufficiently short time, will have a skin of osmotically compacted material at the film/solution interface.

In one preferred embodiment of this invention an article comprising polyelectrolyte complex, such as a polyelectrolyte multilayer or a compacted article comprising polyelectrolyte complex, such as a centrifugally compacted polyelectrolyte complex, is exposed to a first solution of high osmotic pressure for a time sufficient to induce partial or complete osmotic compaction, and then the article is removed from the preferred osmolyte solution and transferred to a second solution that does not comprise osmolyte, or comprises the preferred osmolyte at a lower concentration than the first solution. Such a processing step compacts the complex, removing excess water and possibly excess ions, and transforms it into a stronger and less permeable (to small molecules and ions) material. For example, a polyelectrolyte complex multilayer comprising 20 alternating layers of PSS and PDADMA is made and then exposed to 30 wt % PEG 8000 for 1 hour. The multilayer is then rinsed and has higher modulus than before the exposure to PEG and also is less permeable to ions and small molecules. Optionally, the multilayer, or a thin film of polyelectrolyte complex, is supported on a porous membrane, said pores having a size between about 10 nm and 1000 micrometers. Typical membrane materials are polymeric, inorganic or metallic. Optionally, the osmotically compacted thin polyelectrolyte complex membrane is used to separate solution species as described (for non-osmotically compacted materials) in Malaisamy, R.; Bruening, M. L., Langmuir; 2005; 21; 10587-10592 and references therein, or the osmotically compacted membrane is used to separate vapor phase substances, as described in Sullivan, D. M.; Bruening, M. L., Chem. Mater.; 2003; 15; 281-287. Improved compaction of polyelectrolyte complex leads to more selective membrane separation.

Optionally, the solution of preferred osmolyte further comprises salts, organic solvents or any of the additives described above. Optionally, the temperature of the solution comprising preferred osmolyte is controlled. Higher temperatures accelerate the osmotic compaction process.

The processing steps described in the previous section are also suitable for free, isolated, detached or partially supported films. Examples of free films of polyelectrolyte complexes and methods for producing them are described in U.S. Pat. No. 7,223,327. Examples of partially supported films include those that cover compartments, cavities or pores as in M. Nolte, B. Schoeler, C. S. Peyratout, D. G. Kurth, A. Fery Advanced Materials 17, 1665-1669 (2005). Other examples of partially supported films of polyelectrolyte complex are those described in C. Jiang, V. V. Tsukruk, Advanced Materials, 18, 829-840 (2006), in which detached polyelectrolyte multilayer films are supported at their edges over a cavity or hole. A preferred and general outcome for treating a polyelectrolyte multilayer with a solution of preferred osmolyte as described above is that the product of such a treatment step more closely resembles in composition and morphology a complex that is allowed to equilibrate for infinite time. That is, although the osmotic compaction step represents an additional processing step, in the long run the film properties are more stable.

Additional Additives

Additional additives or fillers that are known to the art for increasing strength, impact resistance, toughness, durability, modulus, chemical resistance and appearance are suited to the present invention. Preferred additives for increasing tensile strength of osmotically compacted polyelectrolyte complex articles include fibers. Preferred materials for said fibers are steel, carbon and polymers. Preferred polymer fibers comprise polyamids and/or polyolefins. Accordingly, the articles of the present invention may be formed into composites which include engineering materials known to increase strength. Additional engineering materials suitable for additives include inorganic and ceramic fibers, carbon nanotubes (single wall and/or multiwall), hydroxyapatite, and calcium carbonate minerals.

Additives are preferably added to the polyelectrolyte solutions before solution precipitation, or are added to the complexes before centrifugal compaction.

Further additives that may be incorporated into the polyelectrolyte complex include carbon powder, inorganic materials such as metallic oxide particles (e.g., silicon dioxide, aluminum oxide, titanium dioxide, iron oxide, zirconium oxide, and vanadium oxide), and clay minerals (e.g., hectorite, kaolin, laponite, montmorillonite). For example, nanoparticles of zirconium oxide added to a polyelectrolyte solution or complex solution tend to improve the abrasion resistance of the article. See Rosidian et al., *Ionic Self-assembly of Ultra Hard ZrO₂/polymernanocomposite Films*, Adv. Mater. 10, 1087-1091. High aspect ratio fillers are preferred for stiffening a compacted article at a relatively low fill loading. Preferred high aspect ratio additives include needle-like clay minerals, such as attapulgite, and carbon-based fibers such as carbon fiber or single or multiwalled carbon nanotubes. Carbon powders may be added to improve the durability of the articles of the invention.

A particular advantage of including high aspect ratio additives is that they may be oriented by elongation flow of the polyelectrolyte complex. Such orientation of the additives may be achieved by extrusion, melt-spinning, wet spinning, solvent spinning or electrospinning or by any method of fiber production known to the art, such as those listed in as listed in "Handbook of fiber chemistry" edited by Menachem Lewin, Eli M. Pearce, 2nd ed., New York: Marcel Dekker, c1998; and "Spinning, extruding, and processing of fibers: recent advances" edited by J. S. Robinson: Park Ridge, N.J.: Noyes Data Corp., 1980; which are herein incorporated by reference. Preferably, the polyelectrolyte complex is formed by solution precipitation of individual polyelectrolytes. A concentrated solution of the complex is made as described in Michaels, A. S., J. Industrial Engin. Chem. 57, 32-40 (1965). The additives are then mixed in. The solution is then spun or extruded through an orifice or pulled through a precipitating solution or electrospun. The resulting fiber is then exposed to a solution of preferred osmolyte to induce osmotic compaction of the polyelectrolyte complex with additives.

Cross-Linking

In one preferred embodiment, a small amount of chemical crosslinking is introduced into the compacted article comprising polyelectrolyte complex for stability, particularly on the surface or skin region of the osmotically compacted article comprising polyelectrolyte complex. Chemical crosslinking of the surface region advantageously increases the durability of the article and "locks" in the article's shape. Chemical crosslinking is preferably accomplished by including difunctional monomers in the polyelectrolytes comprising the complex. For example, a divinyl repeat unit added to the polymerization reaction will be incorporated into two polyelectrolyte chains, giving a crosslink at the connection point. Alternatively, a compacted article may be treated with a difunctional crosslinking agent, such as $XCH_2$-$\phi$-$CH_2X$, where X is a halogen (Cl, Br, or I) and $\phi$ is a phenyl group. The phenyl group may be replaced by another aromatic or aliphatic moiety, and easily-diplaceable groups, such as toluene sulfonate, may replace the halogen. A preferred crosslinking agent is a dihalogenated compound, such as an aromatic or aliphatic dibromide, which is able to alkylate residual unalkylated units on two adjoining polyelectrolyte chains.

Another preferred method of crosslinking a compacted polyelectrolyte complex is heat treatment. For example, Dai et al. (*Langmuir* 17, 931 (2001)) disclose a method of forming amide crosslinks by heating a polyelectrolyte multilayer comprising amine and carboxylic acid groups. Yet another preferred method of introducing crosslinking, disclosed by Kozlovskaya et al. (Macromolecules, 36, 8590 (2003)) is by the addition of a carbodiimide, which activates chemical crosslinking. The level of crosslinking is preferably 0.01% to 50%, and more preferably 0.1% to 10%. Still another method for crosslinking within a polyelectrolyte complex is the use of disulfide bridges. Without being bound to a particular theory, it is thought that crosslinking within the ranges given herein increases the ability of the compacted article comprising polyelectrolyte complex to remember its shape after a deformation event.

Another method of crosslinking a compacted article comprising polyelectrolyte complex is by photocrosslinking. Photocrosslinking may be achieved by the light-induced decomposition or transformation of functional groups that form part of the polymer molecules. See, for example, Strehmel, Veronika, "Epoxies: Structures, Photoinduced Crosslinking, Network Properties, and Applications"; Handbook of Photochemistry and Photobiology (2003), 2, 1-110. See also Allen, Norman S., "Polymer Photochemistry", Photochemistry (2004), 35, 206-271; Timpe, Hans-Joachim "Polymer photochemistry and photocrosslinking" Desk Reference of Functional Polymers (1997), 273-291, and Smets, G., "Photocrosslinkable polymers", Journal of Macromolecular Science, Chemistry (1984), A21(13-14), 1695-703. Alternatively, photocrosslinking of a compacted article comprising polyelectrolyte complex may be accomplished by infusing the compacted article comprising polyelectrolyte complex with a small photoactive molecule, then exposing the compacted article comprising polyelectrolyte complex to light.

Preferred Applications

Preferred applications for the present invention are those requiring tough and/or resilient materials, especially wear joints, especially in aqueous environments. Other applications are those in which a tough skin is needed over a more compliant core.

In one application the compacted article comprising polyelectrolyte complex is used as a shock absorbing pad.

Another preferred application of the compacted article comprising polyelectrolyte complex is as a replacement for soft skeletal material, particularly the disks between spinal vertebrae or the cartilage between bone joints. The material and method described in the present invention is a substantial improvement over the materials and methods described in PCT application WO/2008/027989. The materials described in the present invention are tougher and have higher modulus, yet compliant, which makes them more suited to joints experiencing much wear, such as the knee joint, the hip joint, and the elbow joint.

One example of an artificial intervertabral disk is the Charite™ artificial disk by DePuy Spine Inc., approved by the FDA in 2004. This disk comprises polyethylene sandwiched between metal plates. While the Charite disk allows natural spine flexion, the modulus of the materials used is much higher than that of a natural intervertebral disk such that the artificial disk does not have the same damping (shock absorption) properties.

In one application of the current invention, a disk of the same dimensions as a healthy intravertebral disk is made by centrifugal compaction and shaping of a polyelectrolyte complex. This article is then exposed to a solution of high osmotic pressure to develop a tough skin. The article is then suitable, pending sterilization and the addition of various other optional materials such as anti-inflammatories, antibiotics, antiviral agents, for use as an intravertebral disk replacement.

One approach to replacing disks is to fill intervertebral cavities with a natural polyelectrolyte complex comprising cells that will form new tissue. Cells have been immobilized in polyelectrolyte gels. For example, Lim and Sun (Science, 210:908-910 (1980)) described Islets of Langerhans immobilized in natural polyelectrolytes (alginate gels). There are several potential problems with this. First, natural polyelectrolyte gels tend to be very low modulus and cells take time to grow into fully functional tissue. Thus, the patient will not be able to place full mechanical load on the growing disk before it has fully formed. Second, natural polyelectrolytes, such as chitosan and hyaluronic acid are substrates for cell metabolism. They may be metabolized too quickly and by other cells. Third, nerve cells can grow into disks, which create pain. For these and other reasons, the compacted article of the present invention preferably comprises at least one polyelectrolyte comprising synthetic or non-natural repeat units. The synthetic repeat units are less likely to be degraded/consumed in vivo. Preferably the polyelectrolytes comprise synthetic repeat units.

An intervertebral disk comprises the nucleus pulposus (an interior gel), and the annulus fibrosus (which is tougher and fibrous). Commonly, the annulus tears and the nucleus leaks out. The disk loses thickness and damping capability and may impact the spinal cord or cause irritation. Optionally, the nucleus pulposus is replaced by a compacted article comprising polyelectrolyte complex of the present invention. The polyelectrolyte complex is soft but will not leak out. The additional material added to the disk will separate the vertebrae, reducing deformities of the spine.

In some applications, such as the replacement of an intervertebral disk, the compacted article preferably comprises higher modulus material on the outside or periphery or surface stratum of the article and a lower modulus in the interior region of the article. The lower modulus in the interior or interior region serves to absorb more shock, and the higher modulus in the periphery or surface region serves to retain the shape and integrity of the compacted article comprising polyelectrolyte complex. Accordingly, in one aspect of this invention, there is a gradient in modulus within the compacted article. Such a gradient is preferably achieved by exposing a centrifugally compacted PEC article to an osmolyte and terminating the osmotic compaction process after the formation of a skin between 1 mm and 5 mm thick.

Optionally, the article that results is crosslinked. Crosslinking helps to preserve the gradient in composition. Crosslinking is accomplished by heat treatment, by infusing crosslinking agents into the article from the outside in, or by photocrosslinking the article. The advantage of photocrosslinking the compacted article is that the penetration depth of the light into the compacted article may be controlled by the wavelength selected, such that the crosslinking occurs only within thin surface region on the external surface of the compacted article. Preferably the modulus of the shell or skin, i.e., the surface region or the exterior region, of the compacted article comprising polyelectrolyte complex is at least 2 times greater, preferably at least about 5 times greater, even more preferably at least about 10 times greater than the modulus of the bulk region, i.e., interior region, of the compacted article.

Biocompatibility

It has been shown that certain polyelectrolytes or polymers are biocompatible. For example, a biocompatible polyelectrolyte multilayer, on which smooth muscle cells were grown, has been described by Schlenoff et al (U.S. Pub. No. 2005/0287111) which is herein incorporated by reference. This multilayer comprised fluorinated polyelectrolyte complex, on which cells grow. However, the cells do not consume the fluorinated material. In one aspect of the present invention, therefore, the compacted polyelectrolyte complex article further comprises a surface stratum of fluorinated polyelectrolyte. The surface stratum is preferably obtained by immersing the compacted polyelectrolyte complex article in a solution comprising fluorinated polyelectrolyte. The process may be repeated with alternating positive and negative fluorinated polyelectrolytes to obtain a thicker surface stratum. In one embodiment, the alternating layering to buildup the surface stratum comprising fluorinated polyelectrolyte may be repeated to deposit between about one and about 1000 positively and negatively charged fluorinated polyelectrolyte pairs, preferably between about one and about 250 positively and negatively charged fluorinated polyelectrolyte pairs.

Bioinertness

It has been shown that a polyelectrolyte complex film comprising a zwitterion repeat unit has bioinert properties, i.e., the adsorption of proteins, cells and other biological materials is minimized on the film. Examples are provided in U.S. Pub. No. 2005/0287111. Therefore, in one aspect of the present invention, the compacted polyelectrolyte complex article further comprises a surface stratum comprising polyelectrolytes comprising zwitterionic repeat units. Other bioinert materials are known to the art, such as poly(ethylene glycols), PEG. Therefore, in one aspect of this invention, the compacted polyelectrolyte complex article further comprises a surface stratum of PEG.

Preferably, a copolymer having both charged and neutral repeat units, dispersed randomly, alternately or as blocks, is employed to make the surface biocompatible. More preferably, the charged and neutral repeat units are in blocks, preferably two blocks.

Preferred neutral blocks comprise ethylene oxide or propylene oxide repeat units or zwitterionic repeat units.

When using a charged/neutral polymer to modify the surface of a compacted polyelectrolyte complex article, it is preferred to include a slight excess (between 0.1 and 5 wt %) of one of the polyelectrolytes in the polyelectrolyte complex article in the precipitation phase and then use an osmotic pressure agent comprising a charged/neutral copolymer in the osmotic compaction phase. For example, a small excess of PSS is employed in making a PDADMA/PSS complex, then the complex is compacted first by centrifugation, then the osmolyte comprises poly(N-methyl-2-vinyl pyridinium-co-ethyleneoxide) (PM2VP-co-PEO), the repeat units of which are shown in Table I. Preferably the copolymer is a block with block ratios between 10:1 and 1:10. As a result, a layer of biocompatible PEO will be included on the surface of the article following osmotic compaction.

Other biological materials are known to be biocompatible, such as serum albumin. In one embodiment, the compacted polyelectrolyte complex article may be coated with serum albumin on exposure to in vivo conditions (i.e. following implant).

Having described the invention in detail, it will be apparent that modifications and variations are possible without departing from the scope of the invention defined in the appended claims.

EXAMPLES

The following non-limiting examples are provided to further illustrate the present invention.

In the examples, the following shorthand for polyelectrolyte complexes built on substrates is employed: (A/B)x where A is the starting polyelectrolyte contacting the substrate, B is the terminating polyelectrolyte in contact with subsequent protein solutions and x is the number of layer pairs. In $(A/B)_x$ A, A would be the terminating polymer. Salt, MY (cation M and anion Y), has an important role in the buildup process and is represented by $(A/B)_x$@c MY, where c is the molarity of the salt (MY) in the polymer solution. The pH can be included in the nomenclature especially when using pH dependent polyelectrolytes. For example, $(PAH/PAA)_2PAH$ @ 0.25 M NaCl @ pH 7.4, represent two layers pairs of PAH/PAA built at 0.25 M NaCl and a pH of 7.4.

Example 1

Stress-Strain Behavior of Polyelectrolyte Complex

Several polyelectrolyte complexes were prepared by the multilayer method on a Teflon substrate. Multilayers were then peeled off. Free polyelectrolyte complexes were exposed to salt solutions of various concentrations for durations sufficient to equilibrate the bulk salt concentration of the polyelectrolyte complex with the salt solution. After equilibration, the elastic moduli of the polyelectrolyte complexes were measured.

Poly(styrene sulfonic acid) (PSS, molecular weight 6.8× 104, Mw/Mn=1.5) and poly(diallyldimethylammonium chloride) (PDADMA, molecular weight $3.7×10^5$, $M_w/M_n$=2.09) were obtained from Aldrich. Sodium chloride (NaCl) was obtained from Fisher. Deionized water (Barnstead, E-pure, Milli-Q) was used to prepare all aqueous solutions.

Two polyelectrolyte solutions were prepared, one comprising PSS and one comprising PDADMA. The polyelectrolyte concentration was 0.01 M (with respect to the monomer repeat unit) and the sodium chloride concentration was 1.0 M.

The poly(tetrafluoroethylene) (Teflon™) substrate (50 mm length×24 mm width×1.6 mm thickness) was cleaned in ethanol. The PDADMA/PSS polyelectrolyte complex was built upon the substrate according to the multilayer method by alternately exposing the substrate to the two polymer solutions for 5 minutes using a robotic platform with three rinses of deionized water for 1 minute each. Rinse and polymer solution volumes were 50 mL. The polyelectrolyte complex was annealed at room temperature in a sodium chloride solution (1.0 M) for one week.

The "dry" thickness of the multilayer was determined using Fourier Transform Infrared Spectroscopy (FTIR) comparison (using the strong sulfonate stretch at 1100 $cm^{-1}$) of a PDADMA/PSS polyelectrolyte complex of known thickness (measured with a Gaertner Scientific L116S ellipsometer) with the "thick" PEMU used for mechanical analysis.

The PDADMA/PSS polyelectrolyte complex was pealed off the Teflon™ substrate using flat-ended tweezers and cut into microcoupons (2.0 mm length×150 µm width×9.0 µm dry thickness) with a razor blade. Both ends of a microcoupon were wrapped around aluminum foil clips and secured thereto by applying a drop of silicone rubber before closing the clips.

The aluminum clips were connected to minuten pin hooks on a capacitance-type force transducer (3.3 kHz resonant frequency; Aurora Scientific, Ontario, Canada, calibrated with small weights), and a moving iron galvanometer motor (step time≦300 µs; Aurora Scientific, Ontario, Canada), designed for monitoring contractile behavior of single muscle fibers, mounted on the base of a Leitz Diavert (Wetzlar, Germany) inverted microscope. Silicone sealant was used to stabilize the clips on the minuten pins. Position was monitored by a capacitance-type transducer in the motor. Calibration was done by applying a control voltage input (square wave) to the motor, and measuring (using a microscope) the linear distance traveled in the horizontal plane by a clip attached to the motor hook. This allowed for rapid determination of the delta-position for a given input wave amplitude.

A temperature controlled stage containing six salt solutions of variable ionic strength (0.0 M, 0.2 M, 0.4 M, 0.6 M, 0.8 M. and 1.0 M sodium chloride) was used to soak the polyelectrolyte complex microcoupons for in situ measurements. The salt solutions were held in 200-µL anodized aluminum wells. The temperature was maintained at 28±1° C. with an ATR-4 regulator (Quest Scientific, North Vancouver, BC, Canada). Before every measurement, the polyelectrolyte complex microcoupon was conditioned in the salt solution for 10 minutes. Experimental control, data collection, and analysis of raw data were carried out using a PC-based system with a DT2831-G board (Data Translation, Marlboro, Mass.) and custom software. The software performs a fast Fourier transform method, converts to polar notation, finds the maximum amplitude index, calculates stiffness values and phase shift values, writes them to a file, converts to complex notation, and performs an inverse fast Fourier transform. Force was normalized to the polyelectrolyte complex microcoupon cross-sectional area, which was calculated from the wet thickness at different salt concentrations.

FIG. 1 is a graph depicting the stress-strain behavior of the $(PDADMA/PSS)_{250}$@1.0M NaCl polyelectrolyte complex at different salt concentrations. The curves correspond to salt concentrations as follows: (open circle) 0.0 M NaCl solution; (asterisk) 0.2 M NaCl solution; (triangles) 0.4 M NaCl solution; (crosses) 0.6 M NaCl solution; (squares) 0.8 M NaCl solution; (diamonds) 1.0 M NaCl solution correspond to the stretching cycle (in increasing order of elongation) while (solid circles) 0.0 M NaCl solution; (solid triangles) 0.4 M NaCl solution; and (solid squares) 0.8 M NaCl solution indicate a decreasing elongation cycle.

Figure 2:
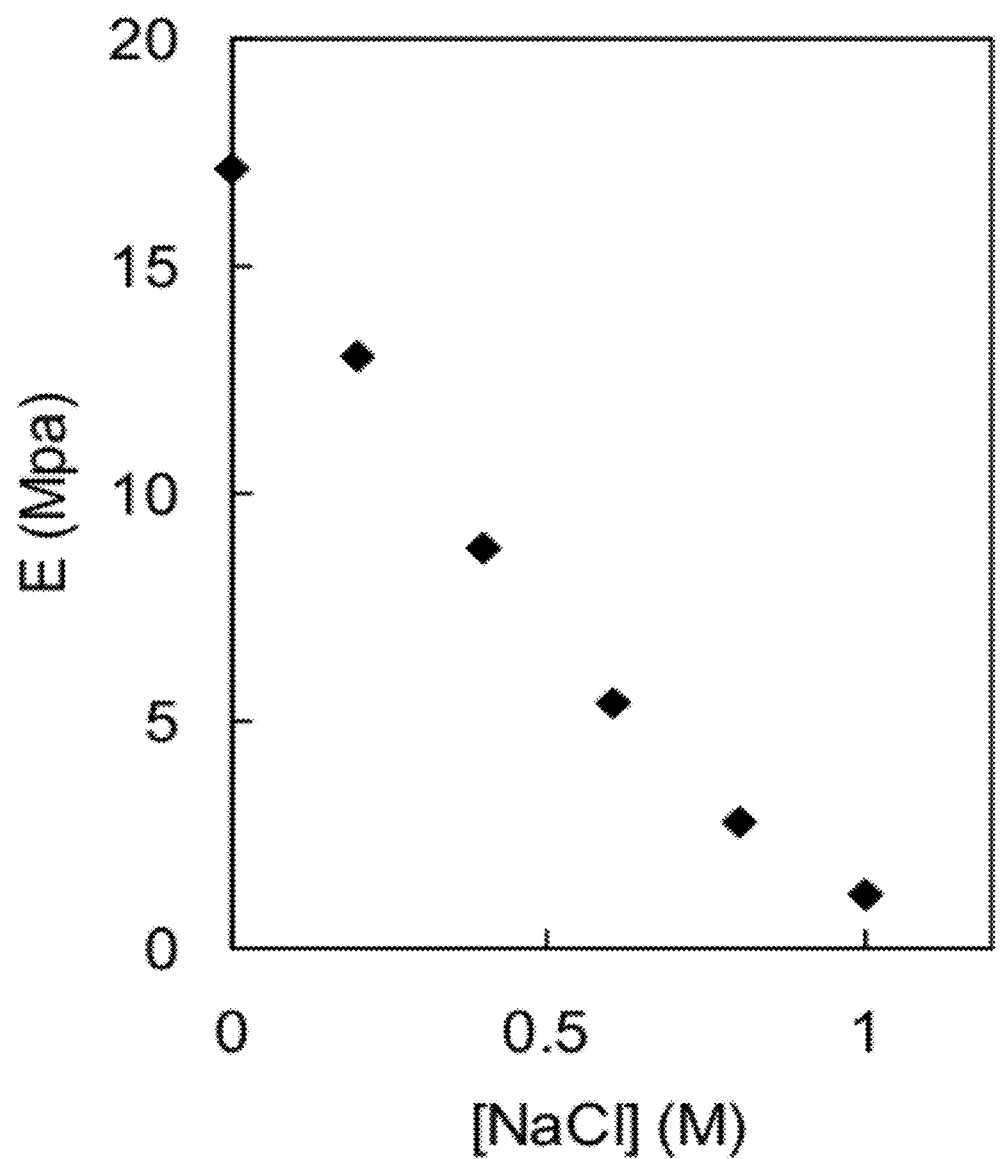
FIG. 2 is a graph depicting the elastic modulus obtained from the slope of the curves in FIG. 1. The data in the graph were obtained according to the method of Example 1.

FIG. 2 shows the elastic modulus, E, of the $(PDADMA/PSS)_{250}$@1.0M NaCl polyelectrolyte complex at different salt concentrations. At 0.0 M NaCl, E=17 MPa. FIG. 2 shows the disadvantage of employing classical small-molecule or ion osmolytes. The osmolytes enter the complex and cause the complex to become softer. The elastic modulus is obtained from the slope of the curves in FIG. 1. Elastic modulus, E, measures the resistance to deformation of a material when stress is applied. Elastic modulus is defined according to the following equations:

$$E = \frac{\sigma}{e}$$

$$e = \frac{L - L_0}{L_0}$$

wherein e is the strain, σ is the stress, and $L_0$ and L are the length of the polyelectrolyte complex at rest and the length of the polyelectrolyte complex after applying a certain strain, respectively.

In agreement with these Equations the relationship between applied strain and resulting stress in polyelectrolyte complex for e<2% (i.e., percent of elongation less than 2% of length of polyelectrolyte complex at rest) was found to be linear. Further, when the elongation cycle was repeated at a certain ionic strength, $\sigma_{eq}$ was reproducible with minimal hysteresis. This means that the multilayer recovered almost completely when the applied strain is removed (i.e. there was no residual deformation).

Elastic modulus, E, evaluated from the slopes of the stress-strain data as shown in FIG. 1, was observed to decrease as the ionic strength increased. That is, the polyelectrolyte complex material becomes softer as more salt is added. A similar trend was observed at the other salt concentrations.

Example 2

Removal of Water from a Polyelectrolyte Complex Multilayer Comprising PDADMA/PSS by a Peg Osmolyte In this example, the water content of a polyelectrolyte complex multilayer is monitored directly by infrared spectroscopy. Polyethylene glycol (PEG) added to the external solution withdraws water and compacts the multilayer.

Materials

All chemicals were used as received unless otherwise specified. Polymers were: poly(diallyldimethylammonium chloride), PDADMAC (Aldrich, $M_w$=3.69×10⁵ $M_w/M_n$=2.09); poly(styrene sulfonate), PSS (Aldrich, $M_w$=5.75×10⁴ and $M_w/M_n$=1.4), poly (ethylene glycol), PEG (Sigma $M_n$=8,000); poly(4-vinylmethylpyridinium bromide), P4VMP (Polysciences, $M_w$=65,500). Salts were obtained from Fisher Scientific: sodium chloride (NaCl), sodium fluoride (NaF), sodium iodide (NaI), sodium bromide (NaBr), sodium azide (NaN₃), sodium thiocyanide (NaSCN), sodium nitrate (NaNO₃), sodium perchlorate (NaClO₄), lithium chloride (LiCl), potassium chloride (KCl), cesium chloride (CsCl), calcium chloride (CaCl₂), magnesium chloride (MgCl₂), and yttrium chloride (YCl₃). Solutions were prepared with 18 MOhm deionized water. Accurate concentrations of salt solutions were determined using conductivity measurements and comparison to tabulated conductivity values. Structures of polyelectrolytes used are shown in the Table VI below:

TABLE VI

Structures of Polyelectrolyte Repeat Units

| Name | Structure |
|---|---|
| Poly(styrene sulfonate) | |
| Poly(4-vinylmethylpyridinium bromide) | |
| Poly(diallyldimethylammonium chloride) | |

Instrumentation

ATR measurements were performed with a Nicolet Nexus 470 FTIR fitted with 0.5 mL flow-through ATR assembly housing a 70×10×6 mm, 45° germanium crystal (Specac Benchmark). The crystal was cleaned using 50:50 v/v ethanol/H₂O in saturated NaCl solution with sonication for 20 minutes. The crystal was then washed with 18 MOhm deionized water and dried with a stream of nitrogen. Polyelectrolyte multilayer deposition on the Ge crystal was carried out by flowing polyelectrolyte solutions (10 mM polymer concentration based on the repeat unit) in 1.0 M NaCl in an alternating manner through the ATR housing assembly with 1.0M NaCl rinse solution in-between. Films were then annealed with 1.0M NaCl for one week. The deposition time for each layer was five minutes. The rinse time was one minute.

Fourteen different salts were employed to prepare solutions of varying concentration, to which multilayers were exposed. The flow-through cell was typically rinsed with several cell volumes of salt solution and FTIR spectra were monitored until the system had equilibrated. An equilibration period of 30 minutes was usually sufficient.

An osmotic compaction experiment exposed polyelectrolyte multilayer thin films to aqueous PEG solutions ranging in concentration from 0 to 30% by weight. PEG solutions also contained either 10 mM (i.e. a minimal, yet defined, concentration) or 0.5 M NaCl.

Figure 3:
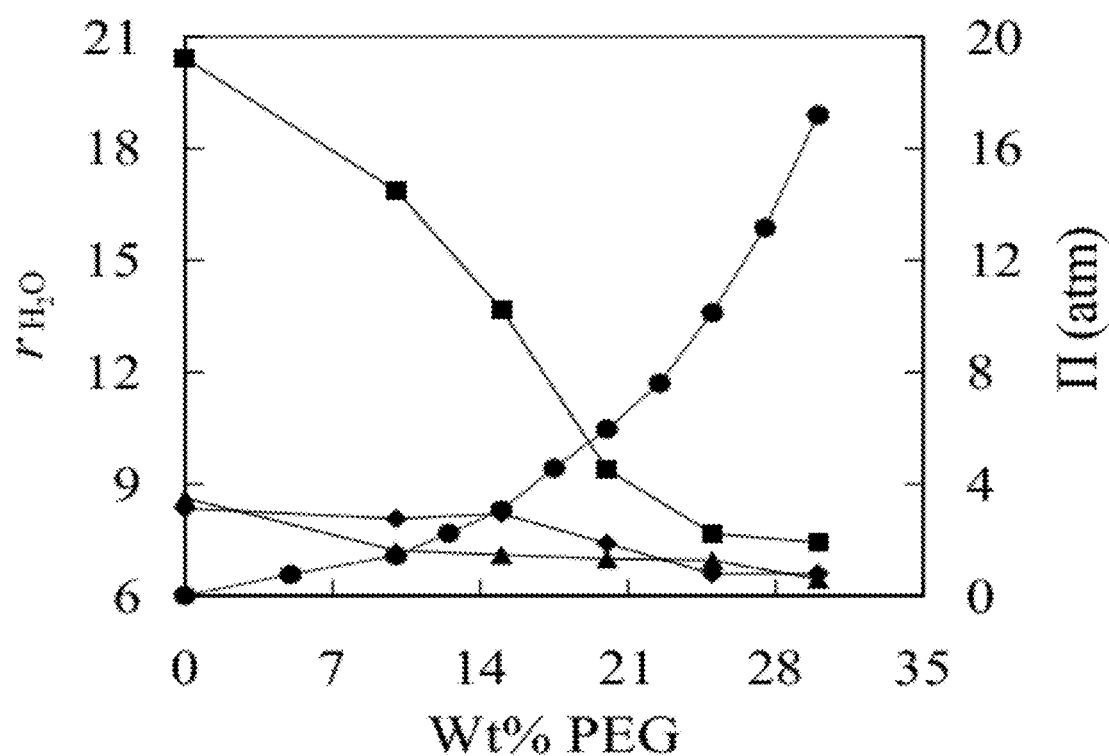
FIG. 3 is a graph depicting the ratio, r, of water molecules to sulfonate groups for a PDADMA/PSS multilayer vs. wt % of PEG osmotic compaction agent at room temperature. The osmotic pressure corresponding to the PEG concentration in pure water at 20° C. is also shown (solid circles). ■, multilayer in 10 mM NaCl before annealing; ♦, in 10 mM NaCl after annealing in 1.0 M NaCl for 24 h; ▲ in 0.5 M NaCl after annealing. The data in the graph were obtained according to the method of Example 2.

All spectra were recorded in situ with 256 scans and 4 cm⁻¹ resolution. Background spectra were recorded on the bare, dry Ge crystal in order to preserve the full water and sulfonate features in subsequent spectra. Spectra were also recorded for the multilayer buildup and shown below for both the PDADMA/PSS and for P4VMP/PSS polyelectrolyte multilayers. The mole ratio of water to sulfonate was determined from the area under the respective peaks (range from 3706-2979 cm⁻¹ for water and from 1052-989 cm⁻¹ for sulfonate. For IR-active salts see Table VII). The results are shown in FIG. 3, which is a graph depicting the ratio, r, of water molecules to sulfonate groups for a PDADMA/PSS multilayer vs. wt % of PEG osmotic compaction agent at room temperature. The osmotic pressure corresponding to the PEG concentration in pure water at 20° C. is also shown (solid circles). ■, multilayer in 10 mM NaCl before annealing; ♦, in 10 mM NaCl after annealing in 1.0 M NaCl for 24 h; ▲ in 0.5 M NaCl after annealing. To calibrate instrument response to $H_2O$ and salts, a 1.00 M solution of PSS (mole ratio of water to sulfonate of 55.6) plus 0.50 M salt was passed over the uncoated crystal. Using the sulfonate signal as a convenient internal standard normalizes out differences in absolute absorbance intensities of water that result from changes in refractive indices of the multilayer. The temperature for all experiments was 23° C.±1° C.

TABLE VII

Wavenumber ranges used for IR-active salts.

| Anion | Range ($cm^{-1}$) |
|---|---|
| Nitrate | 1434-1267 |
| Azide | 2123-1957 |
| Perchlorate | 1116-1052 |
| Thiocyanate | 2105-2017 |

Example 3

Swelling of Polyelectrolyte Complexes by Added Salt

Figure 4A:
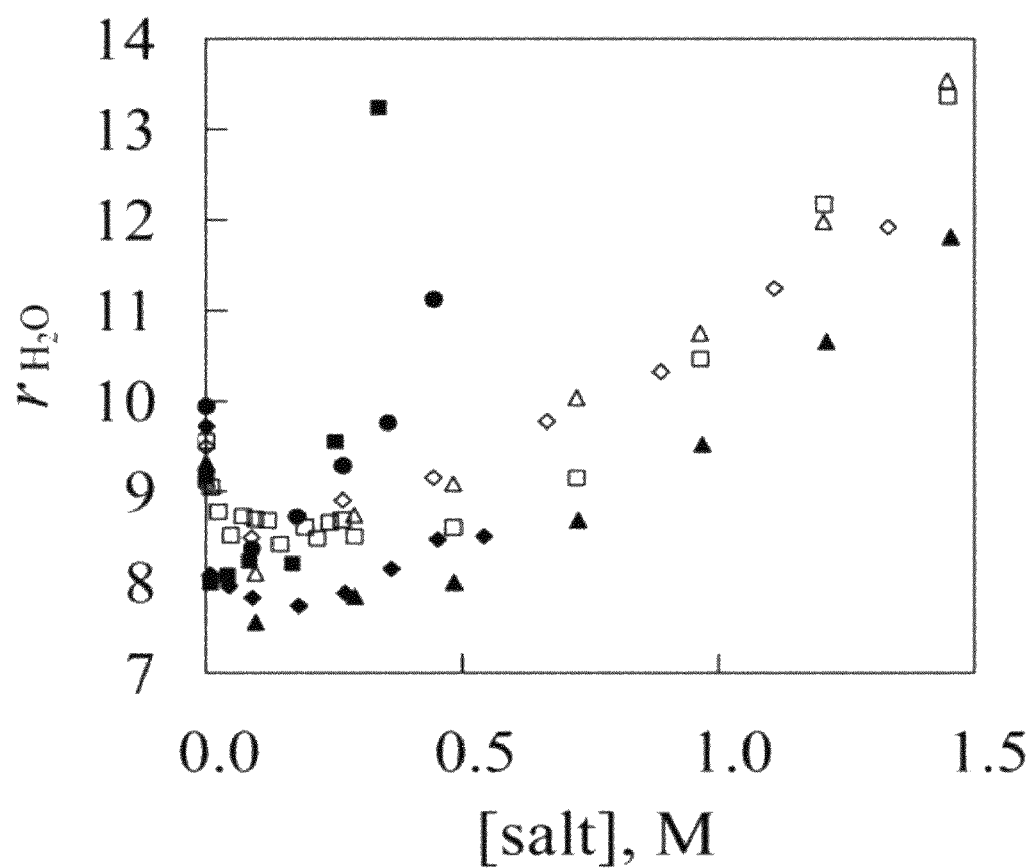
FIGS. 4A and 4B are graphs depicting the number of water molecules per ion pair in PDADMA/PSS (FIG. 4A) and P4VMP/PSS (FIG. 4B) multilayers vs. salt concentration for, ■, NaClO$_4$; ●, NaSCN; ◇ LiCl; Δ, KCl; □, NaCl; ◆, NaN$_3$; ▲, NaNO$_3$. The data in the graph were obtained according to the method of Example 3.
Figure 4B:
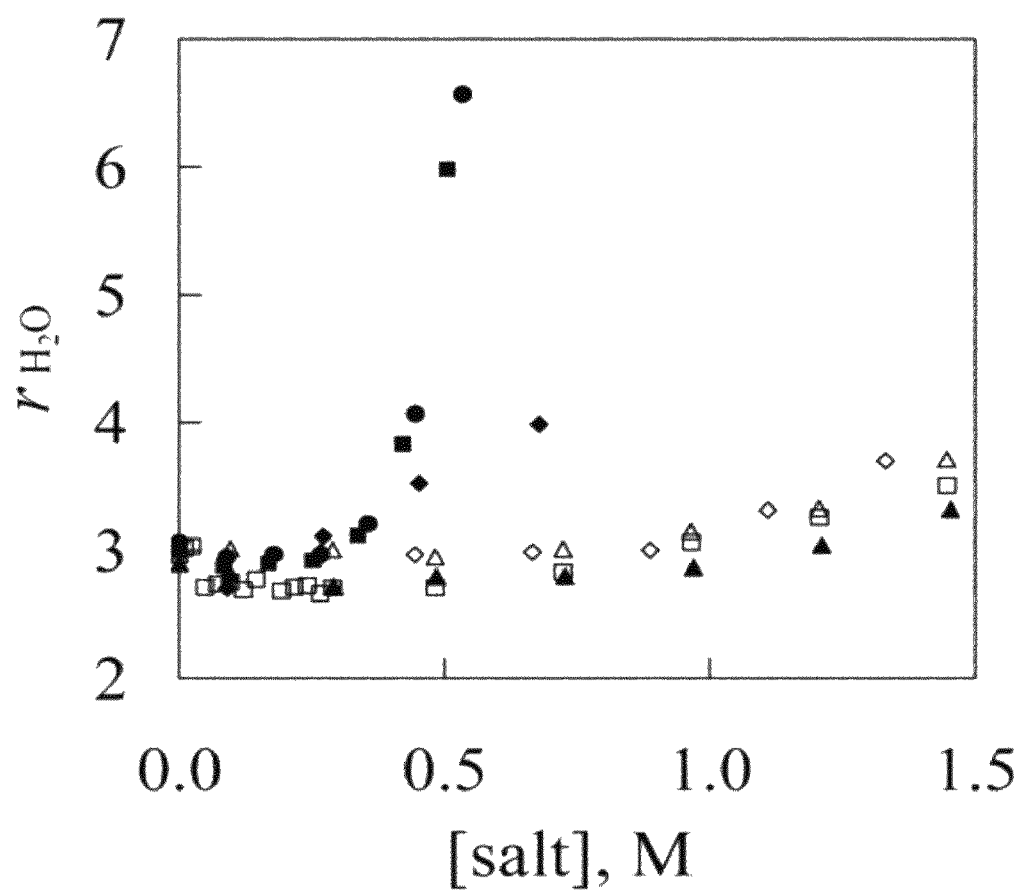

In this Example, low molecular weight (non-preferred) osmolytes are added to solution and the water content of a multilayer is observed directly by FTIR as in the previous Example. It is seen that these non-preferred classical osmolytes actually swell the multilayer, which leads to a decrease in modulus. See FIGS. 4A and 4B, which are graphs depicting the number of water molecules per ion pair in PDADMA/PSS (FIG. 4A) and P4VMP/PSS (FIG. 4B) multilayers vs. salt concentration for, ■, $NaClO_4$; ●, NaSCN; ◊ LiCl; Δ, KCl; □, NaCl; ♦, $NaN_3$; ▲, $NaNO_3$. In comparison, the preferred osmolytes withdraw water, compacting the complex, which leads to an increase in modulus.

Example 4

Osmotic Compaction of a Solution-Precipitated PDADMA/PSS Complex

In this example, a sample of solution-precipitated polyelectrolyte complex is first centrifugally compacted and then further compacted by exposure to a solution of high osmotic pressure comprising preferred osmolyte.

Poly(styrene sulfonanic acid), about 1 M concentration, was neutralized with 1M NaOH. A solution of 0.5 M PSS (molecular weight 75,000) in 2.5 M NaCl was prepared. A solution of 0.5M poly(diallyldimethylammonium chloride), PDADMA, in 2.5 M NaCl was prepared. 20 mL each of 0.5M PSS and 0.5M PDADMAC was mixed with stirring. A precipitate of PSS/PDADMA complex was immediately formed. The blob of precipitate was centrifuged in a Beckman XL-90 ultracentrifuge in a 70Ti rotor using polycarbonate tubes at 50,900 rpm (providing 188,000 g of force) for 4 hours at 25° C.

The compacted article comprising polyelectrolyte complex was removed from the centrifuge tube and cut with a razor blade into cubes approximately 5-10 mm on a side. The white opaque cubes, having the appearance of cheese, were immersed in 30 wt % PEG 8,000 for 3 days for osmotic compaction. During the osmotic compaction period a transparent amber colored skin was observed to spread into the polyelectrolyte complex starting at the interface between the PSS/PDADMA complex and the solution. At the end of the compaction period the articles were completely transparent.

Example 5

Modulus of an Osmotically Compacted Article Comprising Polyelectrolyte Complex

In this example, the Young's modulus of a centrifugally compacted article comprising PDADMA/PSS was measured. The article was then osmotically compacted with a preferred osmolyte. The Young's modulus was measured again and the moduli before and after osmotic compaction are compared.

Samples of dimension approximately 4 $mm^2$ in cross-section area and 1 cm in length were cut and mounted on a Thumler TH-270 tensile testing apparatus. Stress-strain curves were recorded.

Figure 5:
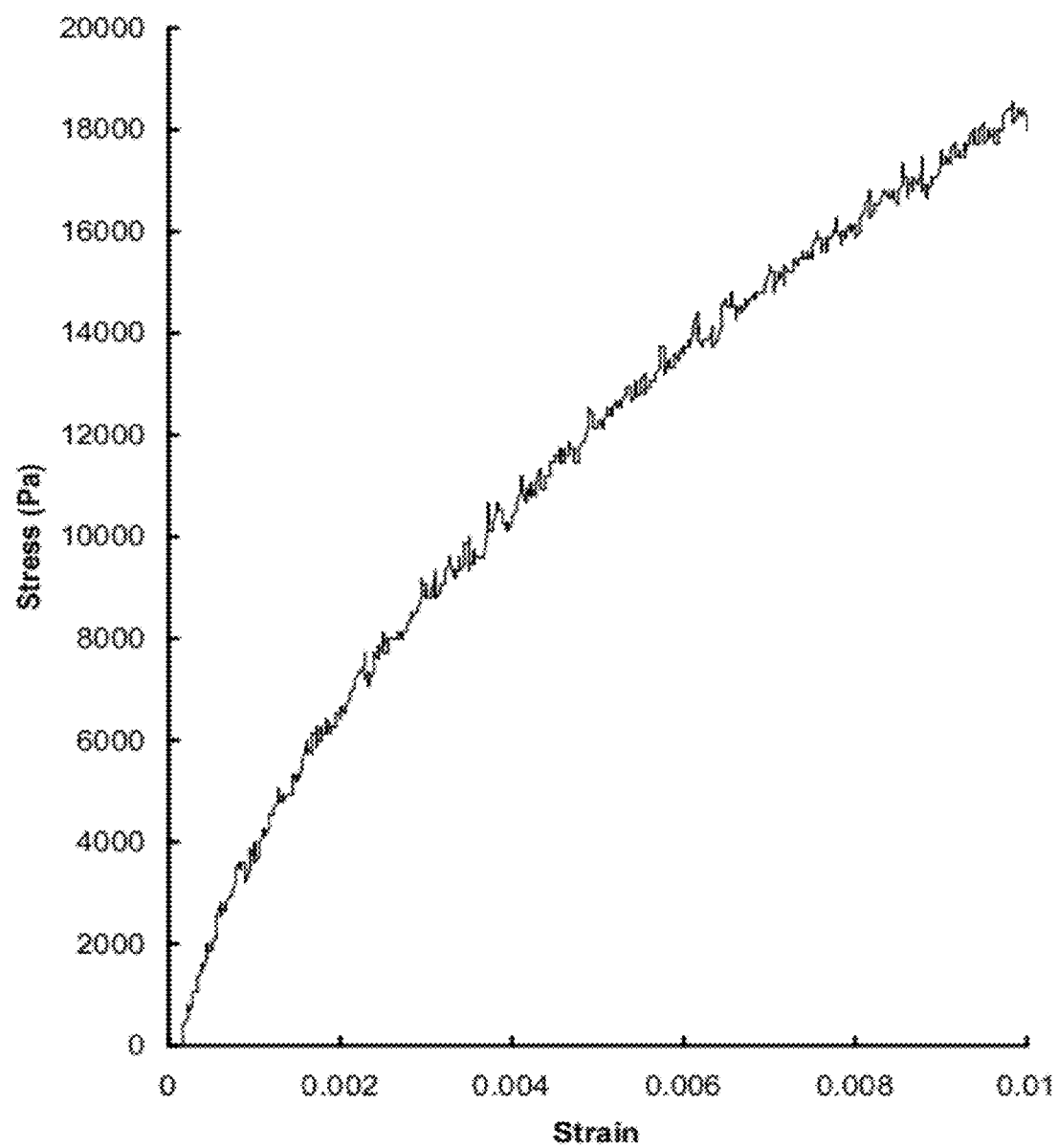
FIG. 5 is a graph depicting the stress-strain curve of a centrifugally compacted polyelectrolyte complex of PSS and PDADMA before osmotic compaction. The article is bathed in water. The data in the graph were obtained according to the method of Example 5.
Figure 6:
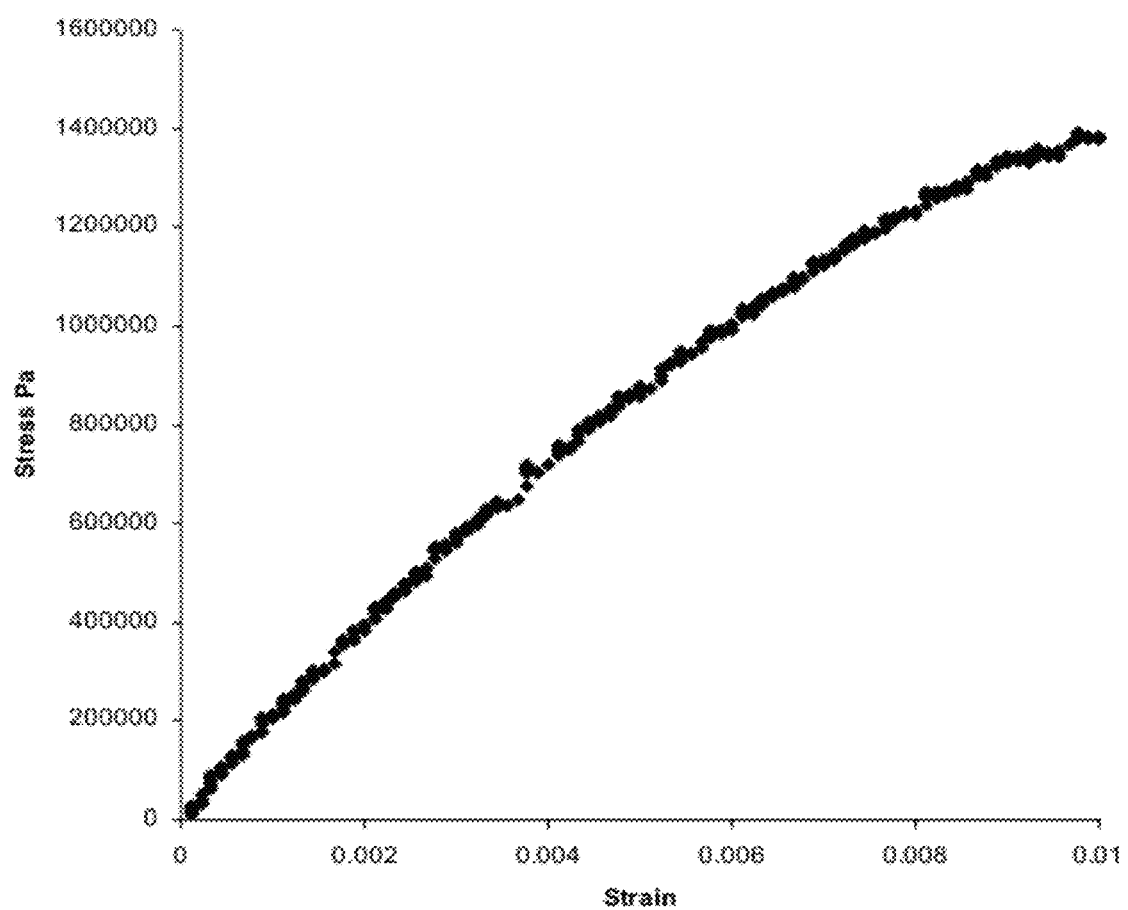
FIG. 6 is a graph depicting the stress-strain curve of a centrifugally compacted polyelectrolyte complex after further compaction in a 30 wt % solution of PEG 8000 in water for 3 days at room temperature. The article is bathed in the solution of preferred osmolyte. The data in the graph were obtained according to the method of Example 5.

FIG. 5 is a graph depicting the stress-strain curve of a centrifugally compacted article comprising polyelectrolyte complex comprising PSS and PDADMA before osmotic compaction. The article is bathed in water. FIG. 6 is a graph depicting the stress-strain curve of a centrifugally compacted polyelectrolyte complex after further compaction in a 30 wt % solution of PEG 8000 in water for 3 days at room temperature. The article is bathed in the solution of preferred osmolyte. It is important to note that the y-axis, the strain, of FIG. 6 is 100× the y-axis, the strain, of FIG. 5.

Figure 7:
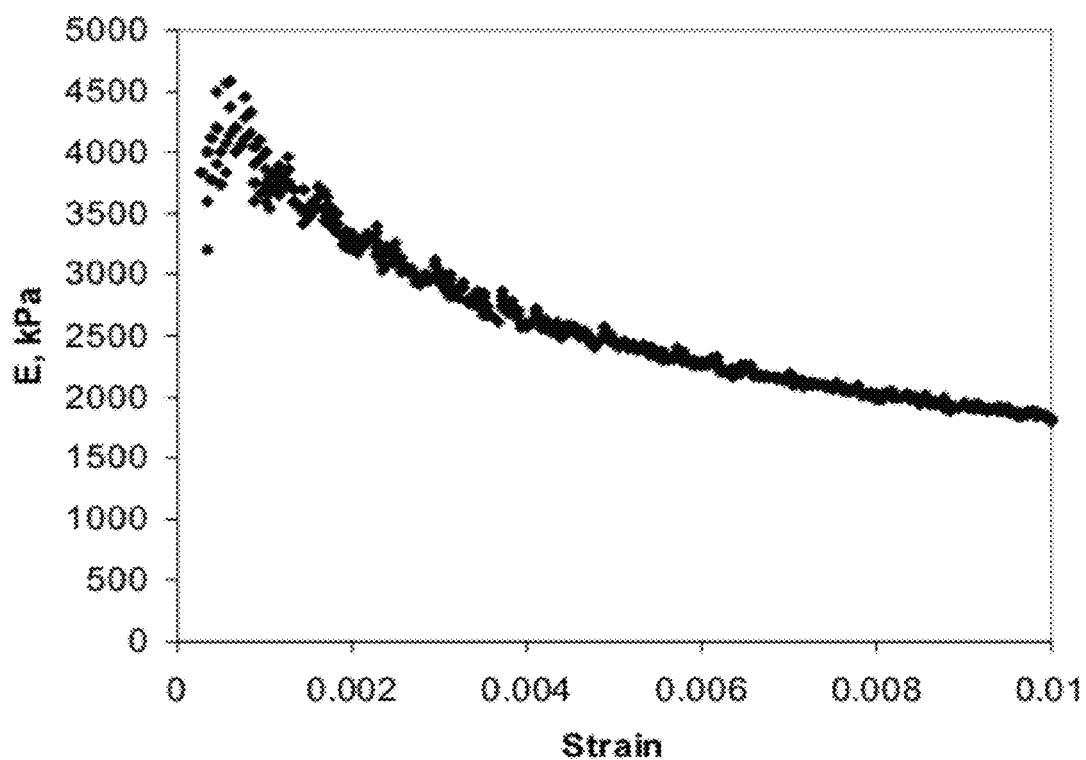
FIG. 7 is a graph depicting the elastic modulus vs. strain for a centrifugally compacted polyelectrolyte complex of PSS and PDADMA before osmotic compaction. The article is bathed in water. The measurements were taken at room temperature. The data in the graph were obtained according to the method of Example 5.
Figure 8:
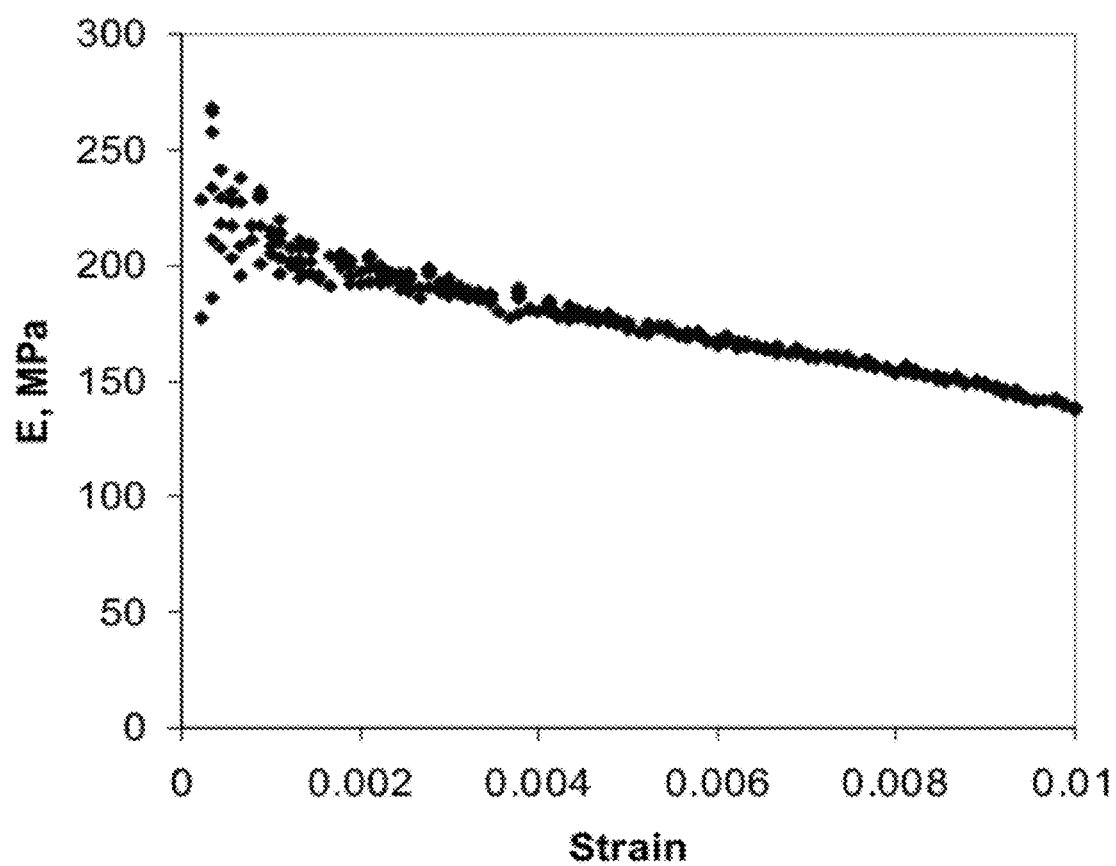
FIG. 8 is a graph depicting the elastic modulus vs. strain curve of a centrifugally compacted polyelectrolyte complex after further compaction in a 30 wt % solution of PEG 8000 in water for 3 days. The data in the graph were obtained according to the method of Example 5.

FIG. 7 is a graph depicting the elastic modulus vs. strain for a centrifugally compacted article comprising polyelectrolyte complex comprising PSS and PDADMA before osmotic compaction. The article is bathed in water. The measurements were taken at room temperature. FIG. 8 is a graph depicting the elastic modulus vs. strain curve of a centrifugally compacted article comprising polyelectrolyte complex after further compaction in a 30 wt % solution of PEG 8000 in water for 3 days. The article is bathed in the solution of preferred osmolyte. Note that the scale of the y-axis, Modulus, of FIG. 8 is 60× the scale of the y-axis, Modulus, of FIG. 7. Thus, osmotic compaction of an article comprising polyelectrolyte complex in the preferred osmolyte increases the elastic modulus for a given strain by a factor greater than 50×. At certain strains, the osmotic compaction of an article comprising polyelectrolyte complex in the preferred osmolyte increases the elastic modulus for a given strain by a factor greater than about 60×. At certain strains, the osmotic compaction of an article comprising polyelectrolyte complex in the preferred osmolyte increases the elastic modulus for a given strain by a factor greater than about 70×. At certain strains, the osmotic compaction of an article comprising polyelectrolyte complex in the preferred osmolyte increases the elastic modulus for a given strain by a factor greater than about 75×.

Centrifugally compacted PSS/PDADMAC complexes having moduli in the kPa range are of widespread interest since many native tissues have moduli in this range. For example in the human intervertebral disks, the nucleus pulposus (~1 kPa) (Iatridis, J. C.; Setton, L. A.; Weidenbaum, M.; Mow, V. C. J. Biomechanics 1997, 30, 1005) and the annulus fibrosis (~100 kPa) (Iatridis, J. C.; Kumar, S.; Foster, R. J.; Weidenbaum, M.; Mow, V. C. J. Ortho. Res. 1999, 17, 732) have moduli in this range.

Example 6

Osmotic Compaction of a Centrifugally Compacted PDADMA/PSS Complex

Figure 9:
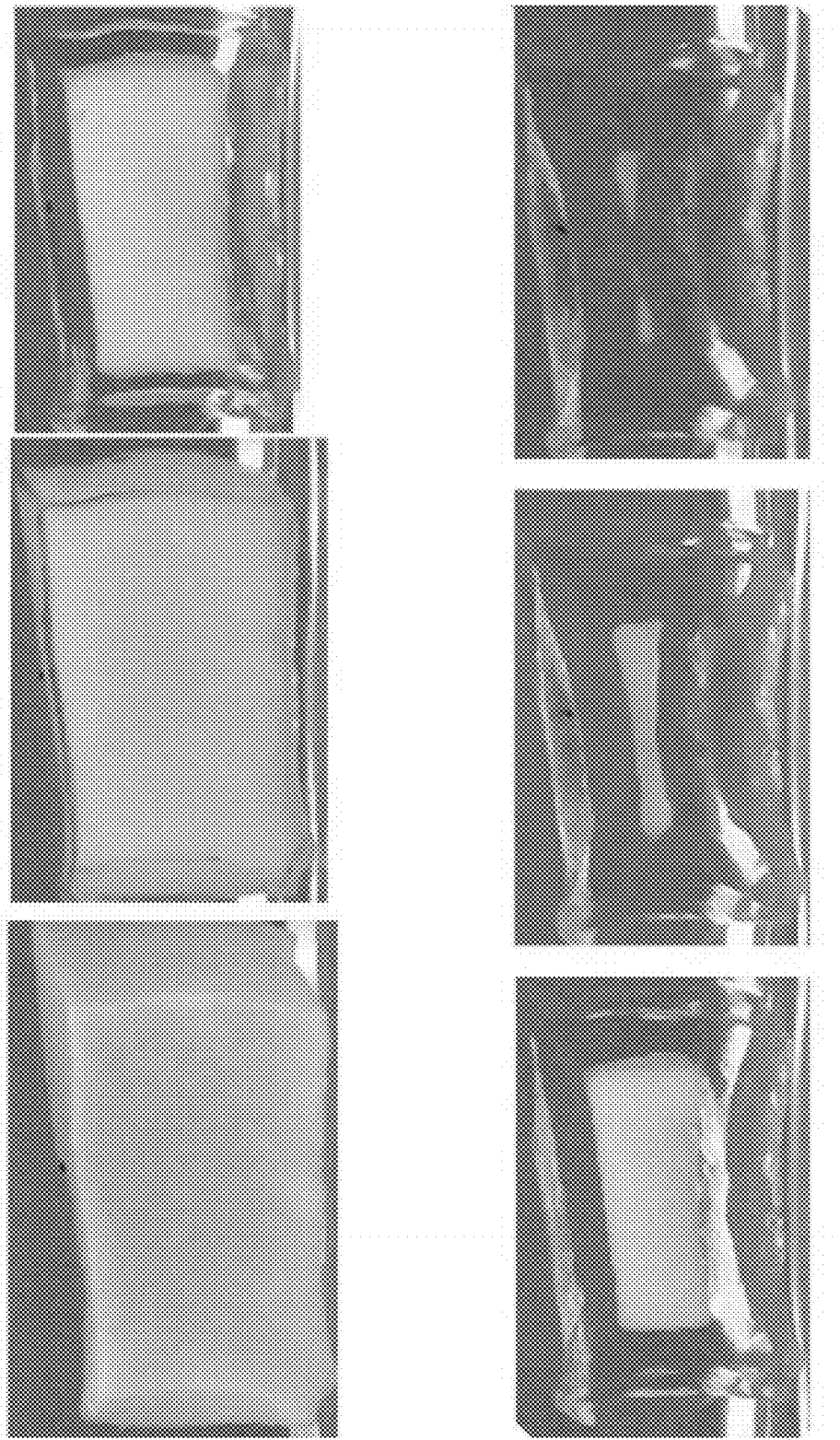
FIG. 9 is a time series photograph of a 1.5 cm×1.5 cm×1 cm cube of centrifugally compacted PSS/PDADMA polyelectrolyte complex. The complex was osmotically compacted according to the method described in Example 6.

A 1.5 cm×1.5 cm×1 cm cube of centrifugally compacted PSS/PDADMA polyelectrolyte complex prepared according to the methods described in Examples 4 and 5 was immersed in a 40 wt % solution of polyethylene glycol (PEG) of molecular weight 8,000 g/mol in water. The sample of compacted polyelectrolyte complex was allowed to remain in contact with the PEG and a transparent region of osmotically compacted polyelectrolyte complex gradually extended into the bulk of the sample over time. The transparent region grows as a skin, as seen in FIG. 9. FIG. 9 is a time series photograph of a 1.5 cm×1.5 cm×1 cm cube of centrifugally compacted PSS/PDADMA polyelectrolyte complex prepared according to Examples 4 and 5. Sample was exposed to a 40% solution of PEG. From left to right, top series, time elapsed=0 minutes, 20 minutes, 5 hours. Bottom series, left to right, time elapsed=11 hours, 22 hours, 32 hours. After about 24 h almost the entire sample of polyelectrolyte complex was osmotically compacted. Shrinkage in the sample is seen as a function of time. The transparent skin had about 50 times the elastic modulus of the opaque core.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above compositions and processes without departing from the scope of the invention, it is intended that all matter contained in the above description and shown in the accompanying drawings shall be interpreted as illustrative and not in a limiting sense.

What is claimed is:

1. An osmotically compacted article comprising a polyelectrolyte complex, the polyelectrolyte complex comprising an interior region and a surface region, wherein the interior region comprises an intermolecular blend of at least one interior positively charged polyelectrolyte polymer and at least one interior negatively charged polyelectrolyte polymer, the surface region comprises an intermolecular blend of at least one surface positively charged polyelectrolyte polymer and at least one surface negatively charged polyelectrolyte polymer, the surface region has a surface elastic modulus, the interior region has an interior elastic modulus, and the surface elastic modulus is greater than the interior elastic modulus.

2. The osmotically compacted article of claim 1 wherein the surface elastic modulus is at least 2 times greater than the interior elastic modulus.

3. The osmotically compacted article of claim 1 wherein the surface elastic modulus is at least 5 times greater than the interior elastic modulus.

4. The osmotically compacted article of claim 1 wherein the surface elastic modulus is at least 10 times greater than the interior elastic modulus.

5. The osmotically compacted article of claim 1 wherein the surface region comprises cross-linking induced by a chemical crosslinking agent, heat treatment, or photo-crosslinking.

6. The osmotically compacted article of claim 1 wherein both the interior and surface predominantly positively charged polyelectrolyte polymer comprises poly(diallyldimethylammonium) and both the interior and surface predominantly negatively charged polyelectrolyte polymer comprise poly(styrene sulfonate).

7. The osmotically compacted article of claim 1, adapted for in vivo use in joints, said joints including the intravertebral space, the knee joint, the shoulder joint, the elbow joint and the hip joint.

8. The osmotically compacted article of claim 1 wherein the polyelectrolyte complex is free of salt crystals having a size greater than about 1 micrometer.

9. The osmotically compacted article of claim 1 wherein the surface region is at least one millimeter thick.

10. The osmotically compacted article of claim 1 wherein the surface region is between one millimeter and five millimeters thick.

11. The osmotically compacted article of claim 1 wherein the polyelectrolyte complex further comprises at least one additive selected from the group consisting of metal fibers, carbon fibers, ceramic fibers, carbon powder, metallic oxide particles, polymer fibers, and clay minerals.

* * * * *